US009922552B2

(12) United States Patent
Amano et al.

(10) Patent No.: US 9,922,552 B2
(45) Date of Patent: Mar. 20, 2018

(54) METHOD OF CONTROLLING DEVICE IN MANNER FREE FROM CONTENTION AMONG MULTIPLE CONTROLLERS

(71) Applicant: Panasonic Intellectual Property Corporation of America, Torrance, CA (US)

(72) Inventors: Katsushige Amano, Kyoto (JP); Tomonori Nakamura, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 41 days.

(21) Appl. No.: 15/089,543

(22) Filed: Apr. 2, 2016

(65) Prior Publication Data

US 2016/0307440 A1 Oct. 20, 2016

(30) Foreign Application Priority Data

Apr. 20, 2015 (JP) ................................ 2015-085714
Dec. 11, 2015 (JP) ................................ 2015-242008

(51) Int. Cl.

| | |
|---|---|
| ***G08C 19/00*** | (2006.01) |
| ***G05B 15/02*** | (2006.01) |
| ***G05B 11/01*** | (2006.01) |
| ***H04L 9/00*** | (2006.01) |
| ***G05B 23/02*** | (2006.01) |
| ***H04N 1/00*** | (2006.01) |
| ***G06F 3/12*** | (2006.01) |

(52) U.S. Cl.
CPC .................................. *G08C 19/00* (2013.01)

(58) Field of Classification Search
CPC ........ G08C 19/00; G05B 15/02; G05B 11/01; G05B 23/02; H04L 9/00; H04N 1/00; G06F 3/12
USPC ............... 340/12.53, 3.41, 825.53, 5.1, 7.33, 340/10.1–10.5; 455/42, 513, 445, 556.1; 710/1; 705/14
See application file for complete search history.

(56) References Cited

U.S. PATENT DOCUMENTS 6,864,778 B2 * 3/2005 Musschebroeck ..... G08C 17/02 340/12.52
7,924,168 B2 * 4/2011 Otsu ..................... H04L 12/282 340/12.54
9,495,818 B2 * 11/2016 Tobita .................. G06Q 20/045
(Continued)

FOREIGN PATENT DOCUMENTS

JP 2001-346276 12/2001
JP 2014-216945 11/2014
(Continued)

*Primary Examiner* — Nam V Nguyen
(74) *Attorney, Agent, or Firm* — Greenblum & Bernstein, P.L.C.

(57) ABSTRACT

A first control apparatus receives a device control log of a second control apparatus, and stores a shared log that results from adding the received device control log of the second control apparatus to a device control log of the first control apparatus. Upon acquiring a control request from a user to control the device, the first control apparatus determines based on the shared log whether the device is ready for control. If the device is determined to be ready, the first control apparatus transmits to the device a control command responsive to the acquired control request.

17 Claims, 19 Drawing Sheets

(56) References Cited

U.S. PATENT DOCUMENTS

| | | | | |
|---|---|---|---|---|
| 2007/0011446 | A1* | 1/2007 | Kato | G06F 21/305<br>713/150 |
| 2007/0169167 | A1* | 7/2007 | Morimura | G06F 21/6218<br>726/1 |
| 2008/0098426 | A1* | 4/2008 | Candelore | H04N 5/4403<br>725/38 |
| 2008/0318564 | A1* | 12/2008 | Kreiner | G08C 17/02<br>455/420 |
| 2012/0019674 | A1* | 1/2012 | Ohnishi | G08C 17/00<br>348/207.1 |
| 2012/0056731 | A1 | 3/2012 | Okabe | |
| 2016/0189538 | A1* | 6/2016 | Endo | G08C 17/02<br>340/12.22 |

FOREIGN PATENT DOCUMENTS

| | | |
|---|---|---|
| WO | 2010/119540 | 10/2010 |
| WO | 2014/175435 | 10/2014 |

* cited by examiner

FIG. 3

T3

| DEVICE ID | CONTROL TIME | DEVICE TYPE | MODEL NAME | CONTENTS OF CONTROL OPERATION | USER |
|---|---|---|---|---|---|
| AIR-CONDITIONER A | 19:45:21 | AIR-CONDITIONER | AC-01 | CHANGING TEMPERATURE SETTING | XXX |
| LIGHTING DEVICE B | 19:45:27 | LIGHTING DEVICE | LT-002 | POWER ON | YYY |
| ... | | ... | | ... | |

FIG. 7

T7

| DEVICE TYPE | MODEL NAME | CONTENTS OF CONTROL OPERATION | CONTROL TIME INTERVALS |
|---|---|---|---|
| AIR-CONDITIONER | AC-01 | POWER | 20 SECONDS |
| AIR-CONDITIONER | AC-01 | CHANGING TEMPERATURE SETTING | 15 SECONDS |
| AIR-CONDITIONER | AC-02 | POWER | 10 SECONDS |
| ... | | | |
| LIGHTING DEVICE | LT-005 | POWER | 3 SECONDS |
| ... | | | |

METHOD OF CONTROLLING DEVICE IN MANNER FREE FROM CONTENTION AMONG MULTIPLE CONTROLLERS

BACKGROUND

1. Technical Field

The present disclosure relates to a control apparatus that controls a device and a control method of the control apparatus.

2. Description of the Related Art

Techniques of using remote controllers to remote control home electronics at home via a network are available.

SUMMARY

One non-limiting and exemplary embodiment provides further improvements in related-art remote control technique.

In one general aspect, the techniques disclosed here feature a method of controlling a device connected to a network that is connected to a first control apparatus and a second control apparatus different from the first control apparatus. The method includes receiving from the second control apparatus a device control log of the second control apparatus, adding the received device control log of the second control apparatus to a device control log of the first control apparatus to obtain a shared log, storing the shared log, acquiring a control request of a user to the device, determining whether the device is ready for control responsive to the acquired control request based on the shared log, and transmitting to the device a control command responsive to the acquired control request if the device is determined to be ready.

In accordance with the disclosure, the device is appropriately controlled in a manner free from contention in control of each controller even if multiple controllers are used.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates an example of a shared log recorded in a log memory;

FIG. 7 illustrates an example of a control time interval table;

DETAILED DESCRIPTION

Figure 1:
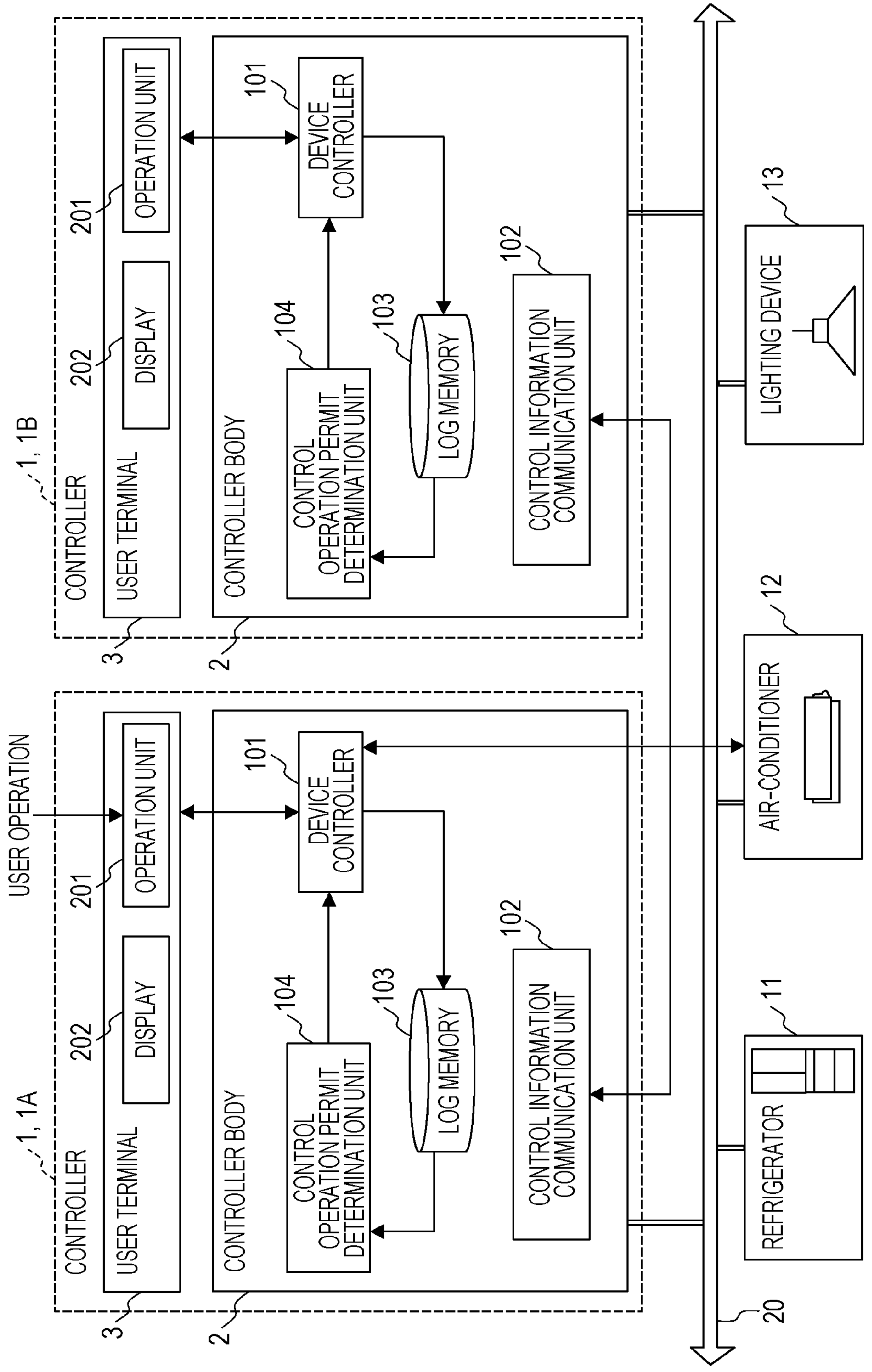
FIG. 1 illustrates an example of an entire configuration of a device control system installed in a home including a control apparatus of an embodiment of the disclosure.

Underlying Knowledge Forming Basis of the Present Disclosure

Techniques of using remote controllers to remote control home electronics at home via a network are available. Remote controlling that permits a short duration of time between a current control operation and an immediately preceding operation may occasionally suffer from inconvenience. For example, a device may take time to start up, and receive no control operation before being fully started up. Another device could be damaged if consecutive control operations are input for a short duration of time. Another device to be controlled needs a predetermined duration of time from one control operation to a next control operation because of device throughput thereof.

A user may use a controller to remote control a device, and may acquire status information of the device to confirm that the device is in a user's desired state. Also, the user may be confused with the state of the device that may be caused by an operation by another user before or after the current operation.

Such a problem may be cleared in this way. The controller may store a log of a control operation performed by the controller, references the log, and indicate to the user that a control operation to the device is currently denied. Alternatively, the controller may hold a control request in suspension for the time being, and perform a control operation on the device after an elapse of an appropriate time period.

Japanese Unexamined Patent Application Publication No. 2014-216945 discloses a remote control technique. In the disclosed technique, a user is requested to decide and instruct a control operation to perform in view of safety information. For example, if control operations contending with each other are to be performed during a predetermined period of time, a request to decide and instruct which control operation to be performed is issued to the user.

There may be multiple controllers at home. For example, television receivers (TVs) having a function of controller may be respectively installed in multiple rooms. A user may operate a TV in each room to control a device. In such a case, the single device is controlled by the multiple TVs.

Japanese Unexamined Patent Application Publication No. 2001-346276 discloses a technique of solving the problems of damage or deadlock caused by concurrent control by multiple controllers. In the disclosed technique, device control systems are prioritized to limit concurrent control of a device by multiple controllers. International Publication No. WO2010/119540 discloses a control technique. In the disclosed technique, each controller periodically creates a controller list that indicates which controller has controlled the device last in order to determine which of multiple controllers is permitted to control the device. A controller currently attempting to control the device determines that the device is currently controlled by another controller if the controller list indicates that the device has been controlled in the latest control operation by the other controller. The controller thus asks the other controller whether the controller is permitted to control the device.

If there are multiple controllers in a home, the device may receive control requests from multiple controllers during a predetermined period of time. Even if the controllers successively control the device in accordance with a device control log stored therein, an appropriate period of time may not necessarily be taken. From the safety point of view or legal point of view, the device desirably responds to control requests with a predetermined duration of time taken therebetween.

According to Japanese Unexamined Patent Application Publication No. 2014-216945, the device is controlled by referencing the log, but the control operation is based on the premise that the device is controlled by a single controller. If multiple controllers cause contention in the control operation, the device is difficult to control appropriately.

According to Japanese Unexamined Patent Application Publication No. 2001-346276, one control instruction is selected to control the device as a control target in accordance with the predetermined priority if a control command from a remote controller contents with a control command from a network interface. The device is thus controlled. The control commands are selected in accordance with not the device control log but the predetermined priority.

According to International Publication No. WO2010/119540, the controller list is periodically generated. A device that has been controlled by none of the controllers may be controlled by a given controller immediately subsequent to the generation of the controller list. In such a case, the information concerning that device is not reflected in the controller list. Control contention to the device is difficult to avoid.

In view of the above background, the inventors have reached embodiments of the disclosure.

According to a first aspect of the disclosure, there is provided a method of controlling a device connected to a network that is connected to a first control apparatus and a second control apparatus different from the first control apparatus.

The control method includes:

receiving from the second control apparatus a device control log of the second control apparatus;

adding the received device control log of the second control apparatus to a device control log of the first control apparatus to obtain a shared log;

storing the shared log;

acquiring a control request of a user to the device;

determining whether the device is ready for control responsive to the acquired control request based on the shared log; and transmitting to the device a control command responsive to the acquired control request if the device is determined to be ready.

According to the first aspect, the first control apparatus receives the device control log from the other control apparatus when the other control apparatus controls the device. The first control apparatus stores the shared log that is the sum of the device control log thereof and the received device control log. The first control apparatus may learn which control apparatus currently controls the device by referencing the shared log, and thus controls the device in a manner free from contention.

According to a second aspect; in the determining; the device is determined to be ready if a predetermined time period elapses since the device is controlled last.

According to the second aspect, the device having received the control request serving as a control target is determined to be controllable if the predetermined period of time has elapsed since the last control operation of the device. The device is thus controlled after the elapse of the predetermined period of time. For this reason, this operation practice follows regulations that the device should be controlled with a predetermined time interval inserted between control operations and causes the device to operate safely.

According to a third aspect, displaying information, indicating that the device is not ready, on a display of the first control apparatus or a display device connected to the first control apparatus via the network if the device is determined to be not ready.

According to the third aspect, the user is notified that the control operation of the device is denied if the first control apparatus determines that the first control apparatus is denied to control the device. The user thus learns that the device is uncontrollable currently. This arrangement avoids inputting of a control request by the user at an inappropriate timing.

According to a fourth aspect, displaying a remaining time until the device is ready.

According to the fourth aspect, the period of time before the first control apparatus is permitted to control the device is displayed. This arrangement reduces the user's annoyance caused by the control operation denial. This arrangement also avoids inputting of a control request by the user during a control denial period, and reduces a process load that is expected to be caused as a result of receiving the control request during this period.

According to a fifth embodiment, displaying information prompting a user to input a response to an enquiry as to whether the device is to be controlled in an automatic manner in response to the acquired control request when the device becomes ready, wherein in the transmitting, the control command is transmitted to the device after the remaining time elapses in response to the input response to control the device in the automatic manner.

According to the fifth aspect, the control command is automatically transmitted in response to the input control request after the elapse of the time period to the control operation permit. This arrangement reduces time to re-enter the control request. The user is allowed to select whether to automatically transmit the control command responsive to the control request.

According to a sixth aspect, displaying a current status of the device.

According to the sixth aspect, the current status of the device is displayed if the first control apparatus determines that the first control apparatus is denied to control the device. The user is thus provided with information for determining whether to control the device.

According to a seventh aspect, detecting a control apparatus that is different in type and function from the first control apparatus, using information contained in communication data transmitted from the different control apparatus; and displaying information, indicating that the different control apparatus is present, on a display of the first control apparatus or a display device connected to the first control apparatus via the network if the different control apparatus has been detected.

According to the seventh aspect, if the control apparatus that is different in type and function from the first control apparatus is detected, the user is also notified of the detection. The user is aware that the different type of the control apparatus is present over the network.

According to an eighth aspect, transmitting information related to the control command to the second control apparatus if the control command has been transmitted in the transmitting.

Since the first control apparatus transmits the information related to the control command to the other control apparatus in the eighth aspect, the first control apparatus shares the device control log of the first control apparatus with the other control apparatus.

According to a ninth aspect, there is provided a method of controlling a device connected to a network that is connected to a first control apparatus and a second control apparatus different from the first control apparatus.

The method of the second control apparatus includes receiving from the second control apparatus a control request of a user to the device input in the second control apparatus;

adding the received control request serving as a device control log of the second control apparatus to a device control log of the first control apparatus to obtain a shared log;

storing the shared log;

determining whether the device is ready for control responsive to the received control request based on the shared log; and transmitting to the device a control command responsive to the received control request if the device is determined to be ready.

According to the ninth aspect, the control request is transmitted to the first control apparatus when the user inputs the control request on the second control apparatus. Upon receiving the control request, the first control apparatus adds the received control request as the device control log of the second control apparatus to the device control log thereof to generate the shared log, and then stores the shared log. By referencing the shared log, the first control apparatus learns which control apparatus currently controls the device, and thus controls the device in a manner free from contention. Since the first control apparatus transmits the control command to the device after the control request input to the second control apparatus is transmitted to the first control apparatus, it is sufficient if the first control apparatus stores the shared long. The other control apparatuses are free from storing the shared log.

According to a tenth aspect, the method may include displaying information, indicating that the device is ready, on a display of the second control apparatus or a first display device connected to the second control apparatus via the network if the device is determined to be ready; and displaying information, indicating that the device is not ready, on a third control apparatus different from the first control apparatus and the second control apparatus or on a second display device connected to the third control apparatus via the network.

According to the tenth aspect, the display of the second control apparatus or the display device connected to the second control apparatus via the network displays the information that the control operation of the device is permitted if the second control apparatus is permitted to control the device. The user of the second control apparatus is thus notified that the control operation to the device is permitted.

On the other hand, the control apparatus other than the second control apparatus or the display device connected to the control apparatus other than the second control apparatus via the network displays the information that the control operation to the device is denied. The user of the control apparatus other than the second control apparatus is notified that the control operation to the device is denied.

The disclosure not only provides the control method to perform the characteristic process described above but also provides a control apparatus configured to execute characteristic steps included in the control method. The disclosure also provides a computer program configured to cause a computer to execute the characteristic steps included in the control method. The computer program may also be distributed via a non-transitory computer readable medium, such as a compact-disk read-only memory (CD-ROM), or a communication network, such as the Internet.

Each of the embodiments described below represents a specific example of the disclosure. Numerical values, shapes, elements, steps and the order of the steps in the embodiments are described for exemplary purposes only, and are not intended to limit the disclosure. Elements not described in independent claims indicative of a generic concept, from among the elements of the embodiments, may be any elements. Contents of the embodiments may be combined in use.

Entire Configuration

The entire configuration of a device control system including a control apparatus in an embodiment of the disclosure is described below. FIG. 1 illustrates an example of the entire configuration of the device control system installed in a home including a control apparatus of an embodiment of the disclosure. The device control system includes two controllers 1 (an example of a first control apparatus and a second control apparatus), for example. To differentiate one controller 1 from the other controller 1, the one controller is designated 1A, and the other controller is designated 1B. Referring to FIG. 1, the two controllers 1 are illustrated for example. The device control system may include two or more controllers.

The controller 1 includes a controller body 2 and a user terminal 3 configured to be operated by the user. A network 20 is installed in the home. The network 20 interconnects the controller 1 to a refrigerator 11, an air-conditioner 12, and a lighting device 13 that are controlled by the controller 1. These devices are controlled by receiving a predetermined control command via the network 20. Referring to FIG. 1, the devices include home electronics, such as the refrigerator 11, the air-conditioner 12, and the lighting device 13. These devices are illustrated for exemplary purposes only. For example, the home electronics may include a washing machine, a microwave oven, a recorder, or audio equipment. Since the devices are installed in the home as illustrated in FIG. 1, the devices are referred to as home electronics. If the device control system of the disclosure is applied in an environment, such as in an office, the device is simply referred to as a device.

The user operates the user terminal 3 to perform a control operation on the refrigerator 11, the air-conditioner 12, or the lighting device 13. The control operation herein refers to an on-off operation of the power of the device, a control operation to change a temperature setting of the air-conditioner 12, or a control operation to change a brightness level of the lighting device 13. By inputting a control request to control the device onto the user terminal 3, the user may remote control the device.

The user terminal 3 may be integrated with the controller body 2 in a unitary body, or may be formed as a unit separate from the controller body 2. If the user terminal 3 is a separate unit, the user terminal 3 simply transmits the control request input by the user to the controller body 2 via the network 20. The user terminal 3 does not necessarily have to be installed in a home. The user terminal 3 may transmit the control request to the controller 1 from outside the home via an outside network or a server.

The network 20 may be a wired or wireless local area network (LAN) installed in the home. For example, the network 20 may be an IEEE 802.3 series wired LAN or an IEEE 802.11 series wireless LAN, or a combination thereof.

Figure 2A:
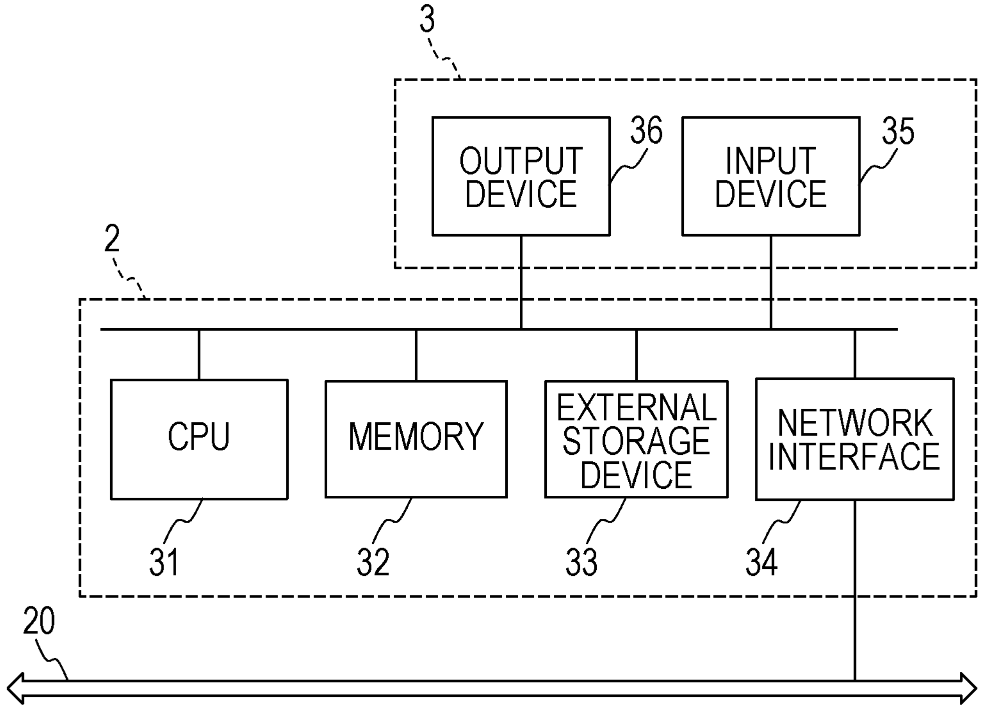
FIG. 2A illustrates an example of a hardware configuration of a controller body, and a user terminal.
Figure 2B:
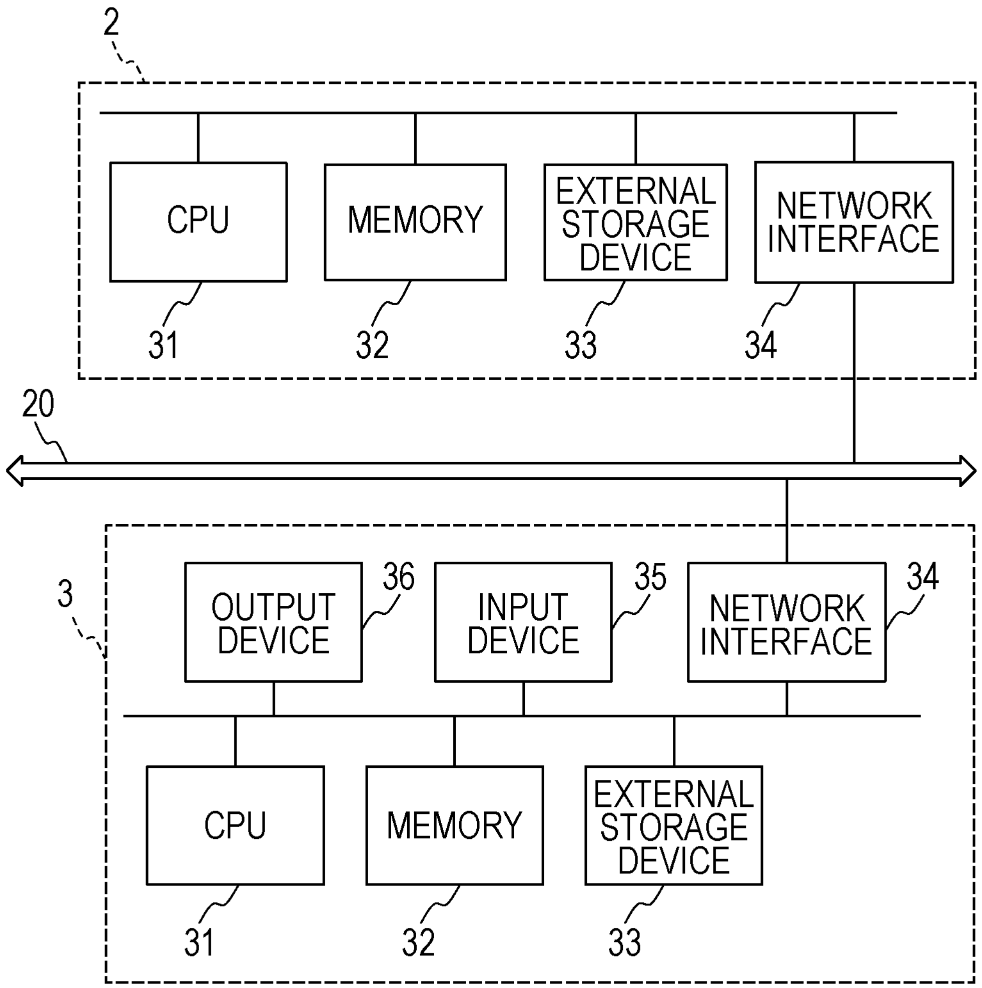
FIG. 2B illustrates another example of the hardware configuration of the controller body, and the user terminal.

FIGS. 2A and 2B illustrate examples of hardware configuration of the controller body 2 and the user terminal 3. FIG. 2A illustrates an example of the hardware configuration of the controller 1 in which the controller body 2 is integrated with the user terminal 3 in a unitary body. FIG. 2B illustrates an example of the hardware configuration of the controller 1 in which the controller body 2 and the user terminal 3 are separated from each other.

As illustrated in FIG. 2A, the controller body 2 includes a central processing unit (CPU) 31, a memory 32, such as a random-access memory, and an external storage device 33, such as a hard disk or a flash ROM. In other words, the controller body 2 has the form of a computer. The controller body 2 of FIG. 2A includes a network interface 34 to be connected to the network 20. The network interface 34 includes a LAN card to connect the controller 1 to the wired LAN, and a communication device to connect the controller 1 to a Wi-Fi wireless communication network.

An input device 35 includes a switch and a keyboard, and an output device 36 is a display device including a display. If the controller 1 includes a touchpanel, the input device 35 and the output device 36 of the user terminal 3 in the form of the touchpanel are integrated with the controller 1. Referring to FIG. 2A, the controller 1 may be mounted on a device, or on a dedicated communication device, such as a gateway, or on a dedicated apparatus, such as a home server.

As illustrated in FIG. 2B, the user terminal 3 is an information processing apparatus that is separate from the controller body 2, such as a tablet terminal. The user terminal 3 includes a CPU 31, a memory 32, an external storage device 33, a network interface 34, an input device 35, and an output device 36. The user terminal 3 of FIG. 2B may be a portable information processing apparatus, such as a smart phone. Referring to FIG. 2B, the controller body 2 may be mounted on a device, or on a dedicated communication device, such as a gateway, or on a dedicated apparatus, such as a home server. The user terminal 3 is an example of a "display device connected to the control apparatus via the network".

Turning to FIG. 1, the controller body 2 includes a device controller 101 (an example of a request receiver), a control information communication unit 102 (an example of a control information transmitter), a log memory 103, and a control operation permit determination unit 104. The user terminal 3 includes an operation unit 201 and a display 202. The device controller 101, the control information communication unit 102, the log memory 103, and the control operation permit determination unit 104 are implemented when a processor, such as the CPU 31, executes software programs. But the disclosure is not limited to this arrangement. The device controller 101, the control information communication unit 102, the log memory 103, and the control operation permit determination unit 104 may be implemented using hardware, such as large scale integration (LSI) or a dedicated circuit (such as an application specific integrated circuit (ASIC) or a field programmable gate array (FPGA)).

The operation unit 201 receives a control request the user has input on the input device 35, and outputs the received control request to the controller body 2. The display 202 includes the output device 36 (FIG. 2A and FIG. 2B), and presents, to the user, information regarding a status of the device notified by the controller body 2.

Upon receiving the control request from the user via the user terminal 3, the device controller 101 transmits a control command via the network 20 to honor the control request to a device serving as a control target. In this way, the device is controlled in response to the control request of the user.

The control information communication unit 102 exchanges device control information with the multiple controllers 1. The device control information indicates which device is controlled in what way.

The log memory 103 stores a shared log that includes a log of a device control operation performed by a first controller 1 and a log of a device control operation performed by a second controller 1 received by the control information communication unit 102.

FIG. 3 illustrates an example of a shared log T3 that is recorded by the log memory 103. The shared log T3 stores "device ID", "control time", "device type", "model name", "contents of control operation", and "user" in association with each other.

The device ID is an identifier uniquely identifying each device at home. The device ID is shared among the multiple controllers 1 at home. More specifically, the same "device ID" represents the same device in any controller 1. The device ID may be a communication address of the device over the network 20, or a serial number unique to each device.

The control time represents time when the device is controlled. The shared log T3 may store, as the control time, at least time when the device was controlled last.

The device type indicates the type of each device, such as an air-conditioner or an illumination device. The model name is a symbol string that is given the device for product classification. The contents of control operation refer to contents of control operation performed on the device. For example, the contents of control operation may be "changing temperature setting" on the air-conditioner 12, "power on" on the lighting device 13, "opening the door" or "closing the door" on the refrigerator 11.

The user indicates a user name of the user who has made a control request on the device. The device control system of FIG. 1 manages user account information in which a user name is associated with a password. The user enters the user name and password to use the device control system, and logs in on the device control system. From the user name entered at the log-in, the device control system identifies the user name of the user who has entered the control request.

Turning to FIG. 1, the control operation permit determination unit 104 determines in accordance with the shared log T3 whether the control operation to be performed by the device controller 101 is permitted. More specifically, if the device controller 101 receives the control request to a given device, the control operation permit determination unit 104 acquires from the shared log T3 the control time of the latest control operation of the device and contents of the control operation. If a predetermined period of time determined by the acquired contents of the control operation has not elapsed since the acquired control time, the control operation permit determination unit 104 determines that the control operation responsive to the control request is denied.

The control operation permit determination unit 104 may calculate a remaining period of time until the control operation is permitted. More specifically, the control operation permit determination unit 104 may calculate the remaining period of time by subtracting the present time from the time resulting from adding a predetermined time interval determined by the acquired contents of the control operation to the control time.

If the predetermined time interval determined by the acquired contents of the control operation has elapsed since the control time acquired from the shared log T3, the control operation permit determination unit 104 determines that the control operation responsive to the control request is permitted.

If the control operation permit determination unit 104 determines that the control operation is denied, the control operation permit determination unit 104 does not transmit a control command responsive to the control request. The control operation permit determination unit 104 displays on the display 202 information that the control operation is denied, and the remaining time until the control operation is permitted. In such a case, the control operation permit determination unit 104 holds the control request in suspension until the control operation is permitted. When the control operation is permitted, the control operation permit determination unit 104 automatically transmits the control command. In this way, this arrangement avoids transmitting the control command to the device before the predetermined time interval has elapsed since the last control operation of the device.

Figure 4A:
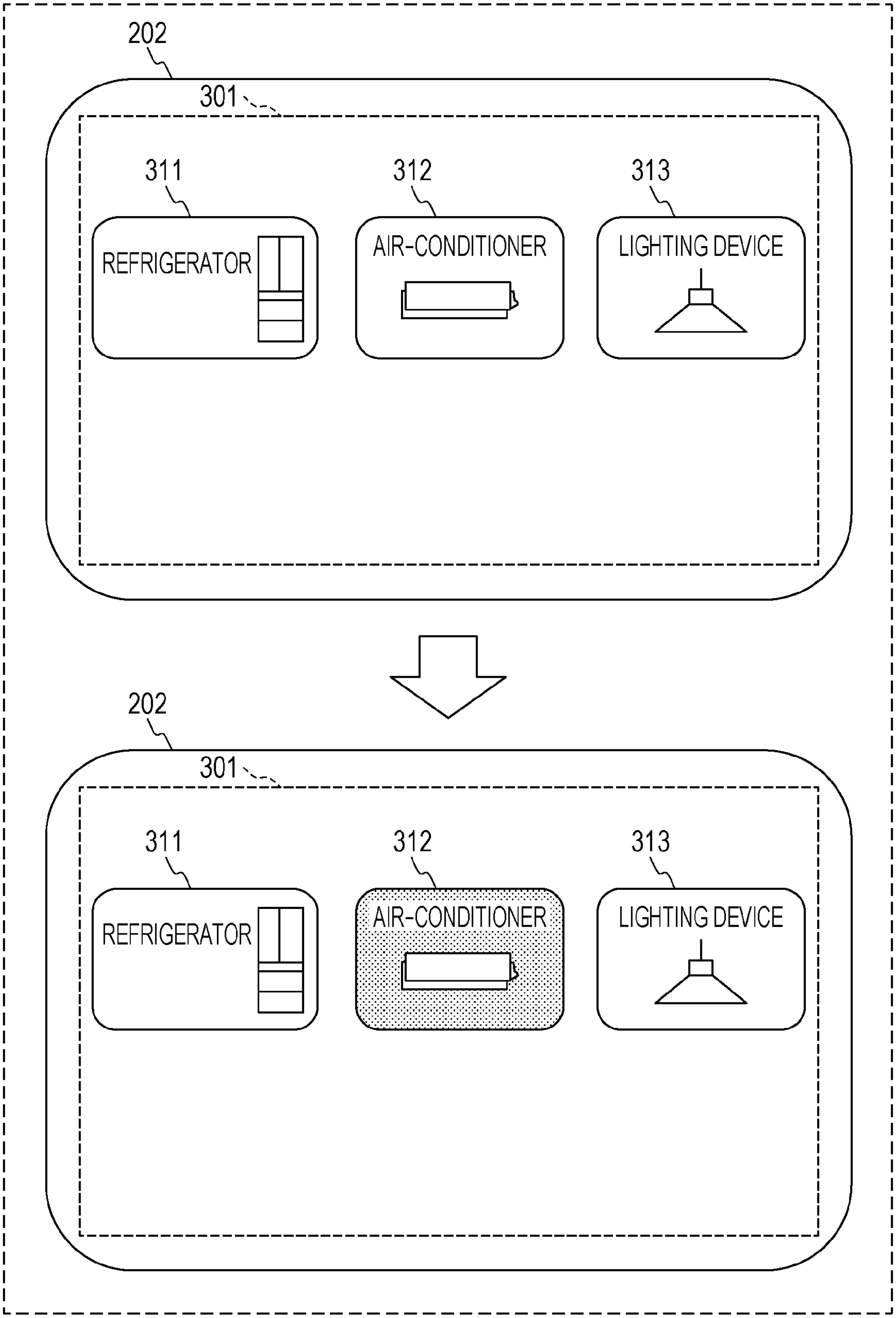
FIG. 4A illustrates an example of a device control screen that a user uses to enter a control request.

FIG. 4A illustrates an example of a device control screen 301 the user uses to enter the control request. The device control screen 301 of FIG. 4A displays a refrigerator icon 311, an air-conditioner icon 312, and an illumination icon 313, respectively representing the refrigerator 11, the air-conditioner 12, and the lighting device 13 installed in the home.

As described above, the control operation permit determination unit 104 determines whether the device is currently controllable or not, using the shared log T3. The top figure of FIG. 4A illustrates the device control screen 301 in an initial state. As illustrated in the top figure of FIG. 4A, the device control screen 301 in the initial state displays all icons in a standard status. The standard status refers to a status in which the icons are displayed at a predetermined regular color.

For example, the controller 1A may now receive a control request to the air-conditioner 12 from the user. The control log of the air-conditioner 12 by the controller 1B may be stored in the shared log T3. The control operation permit determination unit 104 in the controller 1A may determine that the air-conditioner 12 is uncontrollable. In such a case, the display 202 in the controller 1A switches the device control screen 301 to the device control screen 301 illustrated in a bottom figure of FIG. 4A.

The bottom figure of FIG. 4A illustrates the device control screen 301 when the air-conditioner 12 is determined to be uncontrollable. In the bottom figure of FIG. 4A, the device control screen 301 displays the air-conditioner icon 312 in a color different from regular color, thereby indicating that the air-conditioner 12 is uncontrollable. In this case, the color of the air-conditioner icon 312 is switched from white to gray. In this way, the user recognizes that the air-conditioner 12 is currently uncontrollable. As a result, the user is restrained from entering the control request to the air-conditioner 12 that is currently uncontrollable. If a time period throughout which the air-conditioner 12 remains uncontrollable has elapsed and the control operation to the air-conditioner 12 is permitted, the display 202 in the controller 1A switches the device control screen 301 from the device control screen 301 in the bottom figure of FIG. 4A to the device control screen 301 in the top figure of FIG. 4A. In this way, the user recognizes that the air-conditioner 12 is controllable and thus permitted to be used.

Figure 4B:
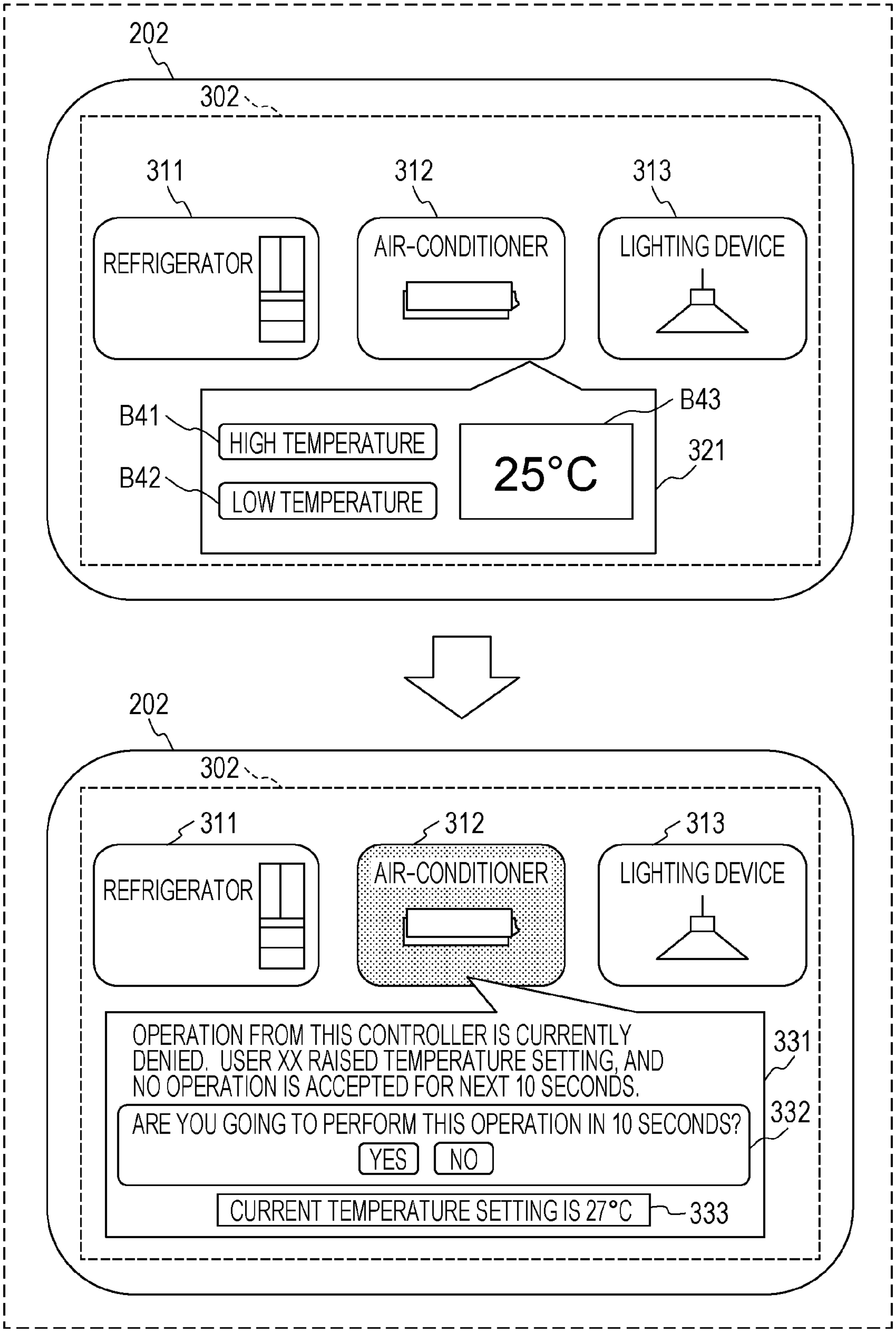
FIG. 4B illustrates another example of the device control screen that the user uses to enter the control request.

FIG. 4B illustrates a device control screen 302 as another screen example. The device control screen 302 includes a device control box 321 in addition to the device control screen 301. The device control box 321 is used to receive a control request to changing a temperature setting on the air-conditioner 12. Note that the display 202 is a touchpanel in the device control screen 302. The device control box 321 includes a raise temperature button B41 labeled “high temperature” used to raise the temperature setting, and a lower temperature button B42 labeled “low temperature” used to lower the temperature setting, and a display temperature box B43 that displays a set temperature. The user changes the set temperature of the air-conditioner 12 displayed on the display temperature box B43 by tapping the raise temperature button B41 or the lower temperature button B42.

Since the user intends to enter the control request to the air-conditioner 12 by tapping the air-conditioner icon 312, the device control box 321 of the air-conditioner 12 is displayed as illustrated in FIG. 4B. The user may simply tap the refrigerator icon 311 or the illumination icon 313 to enter the control request to the refrigerator 11 or the lighting device 13 other than the air-conditioner 12. In such a case, the device control box 321 for the refrigerator 11 or the lighting device 13 may be displayed.

The user enters the temperature setting using the device control screen 302 illustrated in the top figure of FIG. 4B. If the control operation permit determination unit 104 determines that the control operation to the device is denied, the display 202 switches from the device control screen 302 illustrated in the top figure of FIG. 4B to the device control screen 302 in the bottom figure of FIG. 4B.

The device control screen 302 in the bottom figure of FIG. 4B includes a control denial notification box 331 in addition to the device control screen 301 illustrated in the bottom figure of FIG. 4A.

The control denial notification box 331 displays a message reading “Operation from this controller is currently denied. User xx raised temperature setting, and no operation is accepted for next 10 seconds.” The word “xx” here indicates the name of the user who has controlled the air-conditioner 12. “10 seconds” indicate a time period to be taken before the control operation to the air-conditioner 12 is permitted.

The control denial notification box 331 indicates not only the information that the control operation to the air-conditioner 12 is denied but also the information concerning which user's control request has set the control operation to the air-conditioner 12 to be denied, and the remaining time period to be taken before the control operation to the air-conditioner 12 is permitted. The user who is denied to use the air-conditioner 12 is thus notified of the reason why the air-conditioner 12 is uncontrollable, and the remaining time period before the control operation to the air-conditioner 12 is permitted. This reduces the user's annoyance.

The control denial notification box 331 may include a message column (not illustrated) in which the user may write any message when the user enters the control request. The controller 1 having received the message stores in the shared log T3 thereof while transmitting the message together with the input control request to another controller 1. The other controller 1 may store the received message in the shared log T3 thereof. If the control request is received from the user and the control operation permit determination unit 104 in the other controller 1 determines that the control operation is denied, the other controller 1 may read the message from the shared log T3, and may display the message on the control denial notification box 331.

This arrangement causes the intentions of the control requests to be shared by different users, thereby reducing the annoyance to the users that may be caused when the control operation is denied. The message may be input by the user in the above discussion. Alternatively, the user may select a desired message from multiple messages prepared in advance.

The control denial notification box 331 includes a selection column 332. The selection column 332 is used to prompt the user to select whether the control operation responsive to the input control request is automatically performed when the air-conditioner 12 becomes controllable after the elapse of the time period. The selection column 332 displays a question "Are you going to perform this operation in 10 seconds?". The user is thus prompted to select whether the control request is automatically honored. The selection column 332 also includes a "yes" button and a "no" button. To desire the automatic control operation responsive to the control request when the remaining time period has elapsed, the user may choose the "yes" button. If the user does not desire the automatic control operation responsive to the control request when the remaining time period has elapsed, the user may choose the "no" button. If the "yes" button is chosen, the control operation is automatically performed when the remaining time period has elapsed. The user is thus free from the re-entry of the control request, and the user's operation workload is reduced.

Viewing the control denial notification box 331, the user may re-enter the control request or determine from the contents of the status display column 333 that the automatic control operation responsive to the control request is not needed. In such a case, the user may choose the "no" button. The control operation responsive to the control request is not automatically performed when the remaining time period has elapsed. As a result, the controller flexibly meets the needs of the user.

The control denial notification box 331 further includes a status display column 333. The status display column 333 is used to display the current status of the device responsive to the control request input by the user. The user may now input the control request to change the temperature setting on the air-conditioner 12. The status display column 333 displays a message reading "Current temperature setting is 27° C." to notify the user of the current set temperature of the air-conditioner 12.

If the air-conditioner 12 is currently uncontrollable, there is a possibility that another controller 1 may have entered a control request to change the temperature setting of the air-conditioner 12 just before the current input. In such a case, the current temperature setting on the air-conditioner 12 may be different from the temperature setting desired by the user. The status display column 333 displays the current status of the air-conditioner 12, thereby providing information that the user may reference to determine whether to make the control request again. The controller 1 may reference the shared log T3 to learn the current status of the air-conditioner 12 or may directly communicate with the air-conditioner 12 via the network 20 to learn the current status of the air-conditioner 12.

The user may desire to enter a control request for an operation, other than changing the temperature setting, as a control request to the air-conditioner 12 (for example, to power on or to switch an operation mode). In such a case, the device control box 321 in the top figure of FIG. 4B may include a switching button to switch to a device control box 321 that receives another control request. In this way, the user may switch from the device control box 321 to the device control box 321 configured to receive a desired control request.

Figure 4C:
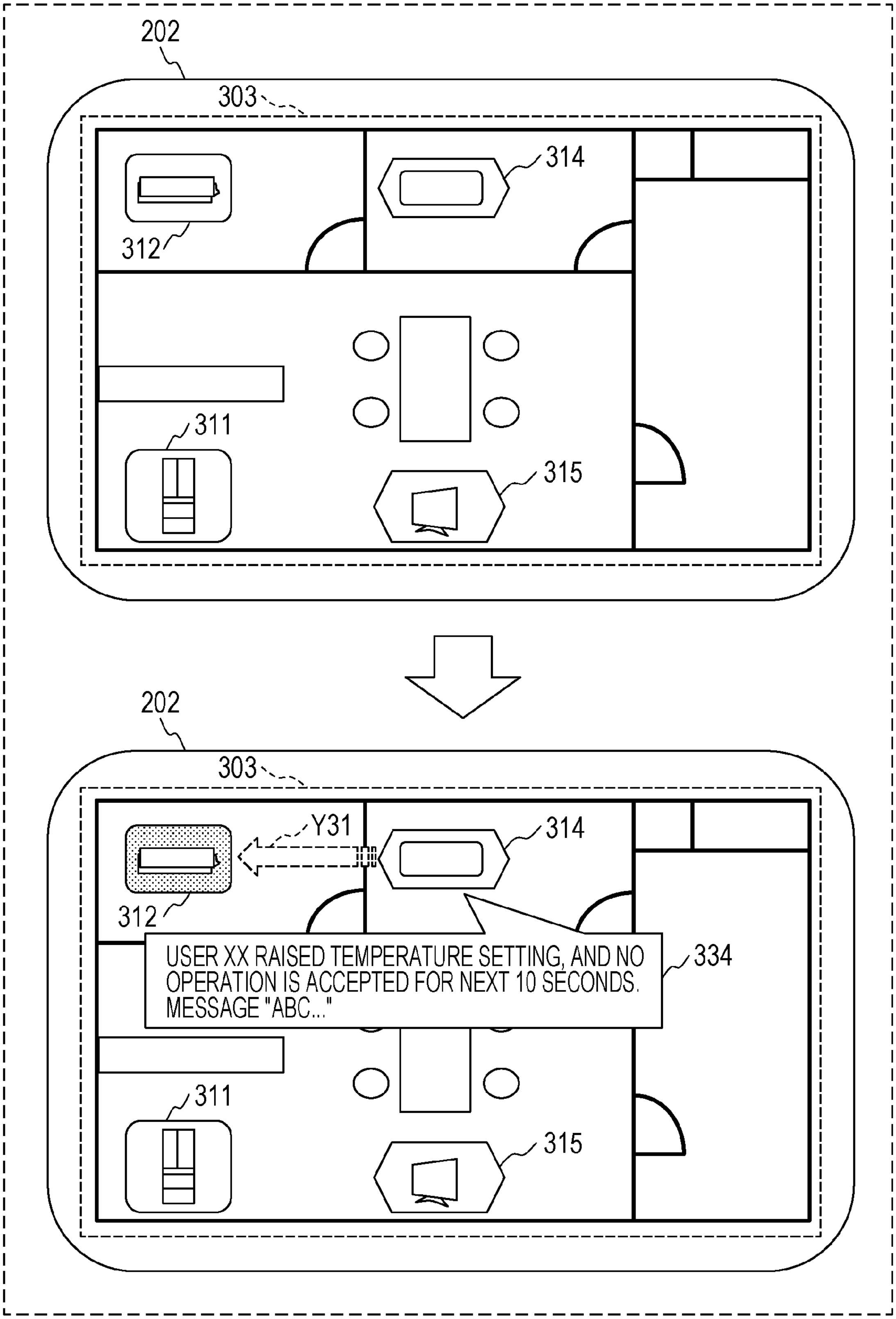
FIG. 4C illustrates another example of the device control screen that the user uses to enter the control request.

FIG. 4C illustrates a device control screen 303 as another screen example. The device control screen 303 of FIG. 4C notifies the user whether the control operation to the device is permitted or not by displaying a device icon of the device installed at home on a layout screen indicating the layout of the home. The device icon is displayed at a location on the layout screen corresponding to an actual installation location of the corresponding device.

The device control screen 303 includes device icons 314 and 315 indicating two controllers. The top figure of FIG. 4C illustrates the device control screen 303 in an initial state.

A controller 1A represented by the device icon 314 in the bottom figure of FIG. 4C controls the air-conditioner 12 represented by the air-conditioner icon 312. The control operation permit determination unit 104 in the controller 1A determines that the air-conditioner 12 is uncontrollable. In such a case, a control denial notification box 334 is displayed on the device control screen 303 of each of the controller 1A and the controller 1B represented by the device icon 315 (the device icon in a television-like form). The control denial notification box 334 is similar in display content to the control denial notification box 331 in the bottom figure of FIG. 4B. In the bottom figure of FIG. 4C, however, the control denial notification box 334 is displayed at the moment the controller 1A represented by the device icon 314 has performed the control operation on the air-conditioner 12 in response to the control request.

The control denial notification box 334 displays a message reading "User "xx" raised temperature setting, and no further operation is accepted for next 10 seconds." The control denial notification box 334 thus clearly states the user "xx" has raised the temperature of the air-conditioner 12. The control denial notification box 334 also displays a message input by the user "xx", and thus clearly indicates the intention of the control request.

The device control screen 303 displays an arrow mark Y31 directing from the device icon 314 to the air-conditioner icon 312. With the arrow mark Y31, the user recognizes at a glance that the air-conditioner 12 is controlled by the controller 1A represented by the device icon 314.

Embodiments of the controller 1 of the disclosure are more specifically described below.

First Embodiment

Figure 5:
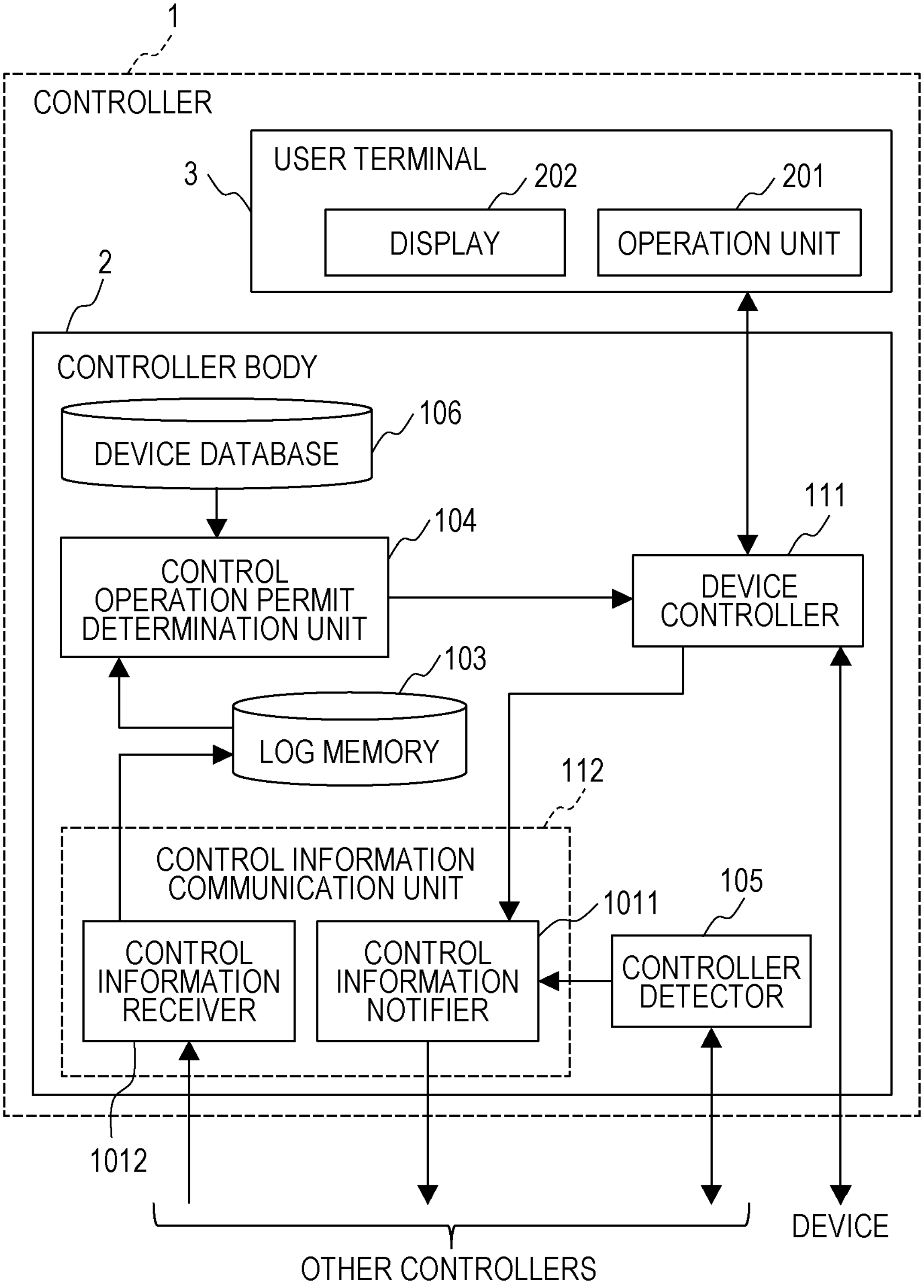
FIG. 5 illustrates a configuration example of a controller of a first embodiment.

FIG. 5 illustrates a configuration example of a controller 1 of a first embodiment of the disclosure. The controller 1 includes a controller detector 105 and a device database 106 in addition to the elements of the controller 1 of FIG. 1. In the first embodiment, the control information communication unit 112 includes a control information notifier 1011 and a control information receiver 1012.

Figure 6:
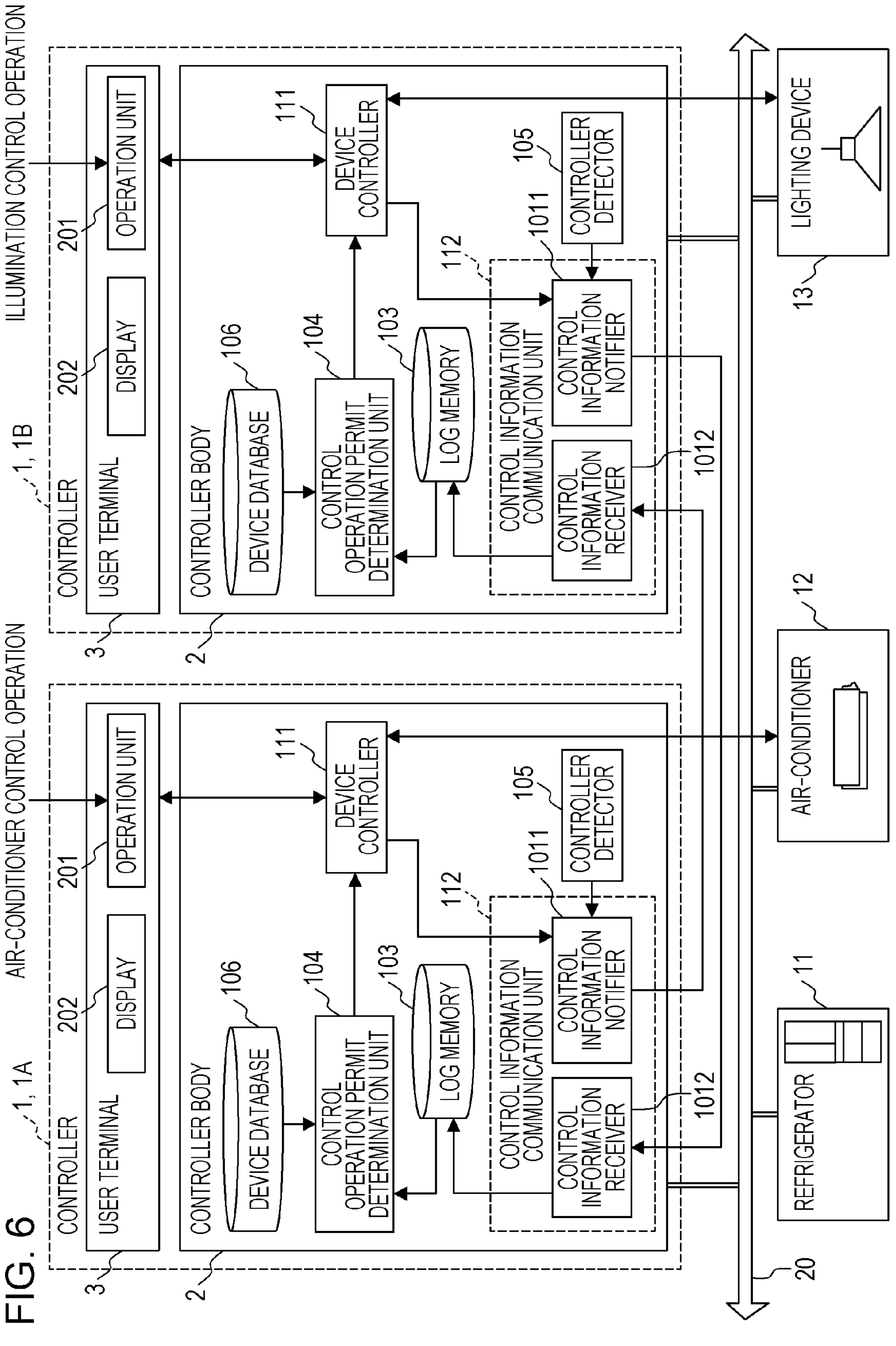
FIG. 6 illustrates an entire configuration of a device control system of the first embodiment.

FIG. 6 illustrates an entire configuration of a device control system of the first embodiment. In the first embodiment, each of controllers 1A and 1B determines whether to accept the control request input by the user. Even if each of the controllers 1A and 1B determines that the control action responsive to the input request is denied, there are times when each of the controllers 1A and 1B may hold the input control request in suspension until the control action is permitted.

The controller detector 105 detects another controller 1 connected to the network 20. For example, the controller detector 105 periodically broadcasts to the network 20 a presence notification indicating the presence of the controller 1. The controller detector 105 also receives the presence notification from the other controller 1. In this way, the controllers 1 detect each others presence.

Alternatively, the controller detector 105 may broadcast an acknowledgement request requesting another controller 1 to reply thereto. In such a case, upon receiving the acknowledgement request from another controller 1, the controller detector 105 replies to the acknowledgement request. Depending on the protocol of the network 20, the term "broadcast" may be used to indicate transmission to many and unspecified users. Depending on the communication method, the transmission to many and unspecified users may be referred to as "multicast". In the context of the disclosure, the term "broadcast" collectively refers to the transmission to many and unspecified users, including "multicast".

The device database 106 stores a control time interval table T7 that defines control time intervals depending on the type and control of the device. FIG. 7 illustrates an example of the control time interval table T7. The control time interval table T7 stores "device type", "model name", "contents of control operation", and "control time intervals" in association with each other. The "device type", "model name", and "contents of control operation" are identical to those of FIG. 3.

The control time interval is an idling time interval that needs to be opened until the next control operation is performed after the current control operation is performed on the device. The control time interval table T7 is stored in the controller 1, for example. Alternatively, the control time interval table T7 may be stored in a cloud server outside the controller 1. In such a case, the controller 1 may reference the control time interval table T7 arranged outside the controller 1 as appropriate.

In accordance with the first embodiment, the control operation permit determination unit 104 references not only the shared log T3 but also the control time interval table T7, and determines whether the control operation by the device controller 101 is permitted or not. More specifically, when the device controller 111 receives a control request to a given device, the control operation permit determination unit 104 acquires from the shared log T3 the "control time" of the last control operation of the device and the "contents of the control operation". The control operation permit determination unit 104 also acquires from the control time interval table T7 the "control time interval" responsive to the acquired contents of the control operation. Based on the acquired control time, the control operation permit determination unit 104 determines that the control operation responsive to the control request is denied if the acquired "control time interval" has not elapsed.

The control operation permit determination unit 104 may calculate the remaining time period by subtracting the current time from the time that results from adding the acquired control time interval to the acquired control time interval.

If the acquired control time interval has elapsed since the acquired control time, the control operation permit determination unit 104 determines that the control operation responsive to the control request is permitted. The device is thus appropriately controlled at an appropriate time interval in accordance with the type of the device and the contents of the control operation to the device.

The control information notifier 1011 transmits device control information to another controller 1 that has been detected by the controller detector 105. The control information receiver 1012 also receives device control information from the other controller 1. The device control information, indicating that the control operation responsive to the control request has been performed, is notified to the other controller 1. The device control information includes "device ID", "control time", "device type", "model name", and "contents of control operation" in association with each other. Upon receiving the device control information, the other controller 1 stores the contents of the device control information in the shared log T3. The multiple controllers 1 thus store the same shared log T3.

Figure 8A:
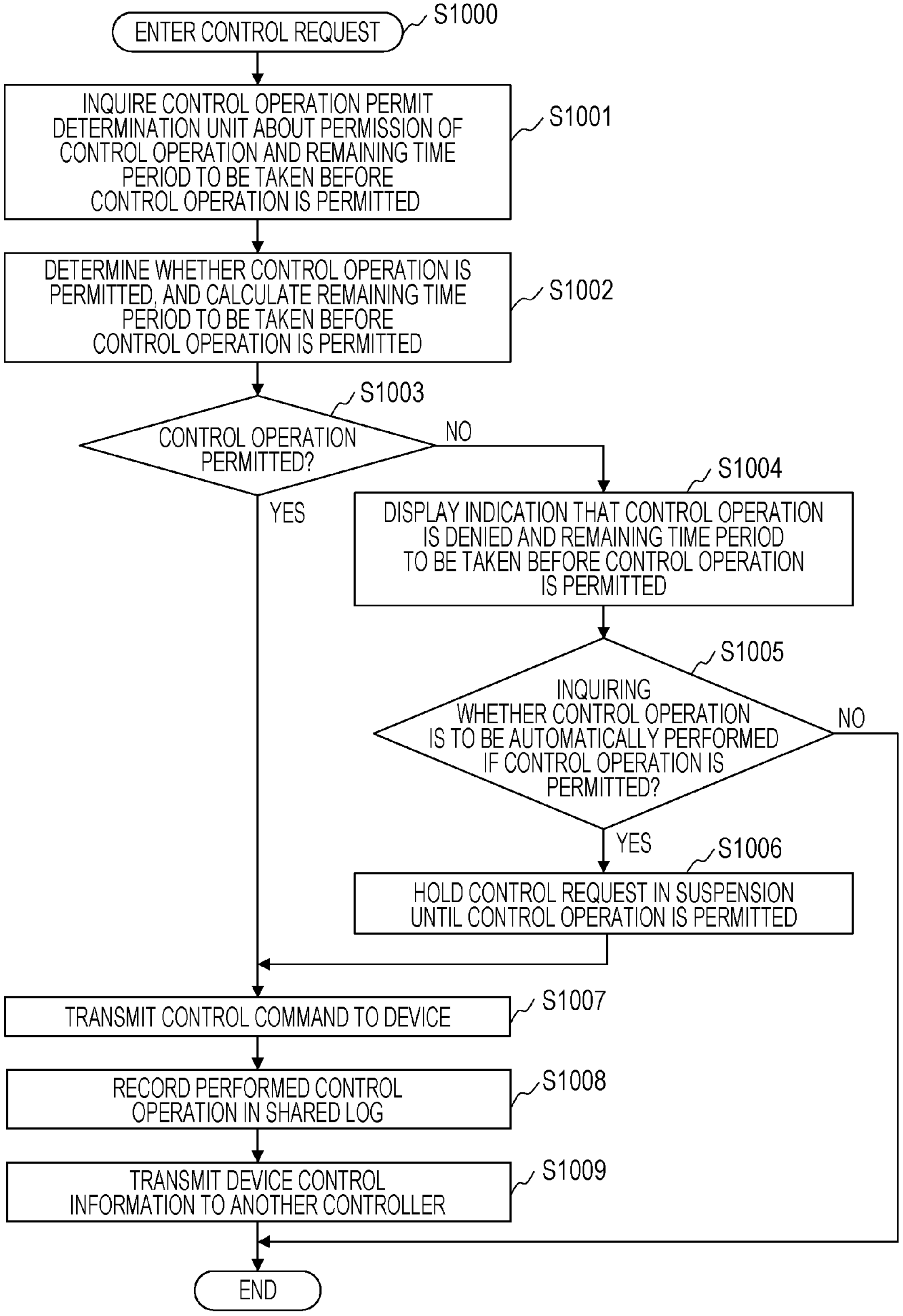
FIG. 8A is a flowchart illustrating a process routine of the controller of the first embodiment.
Figure 8B:
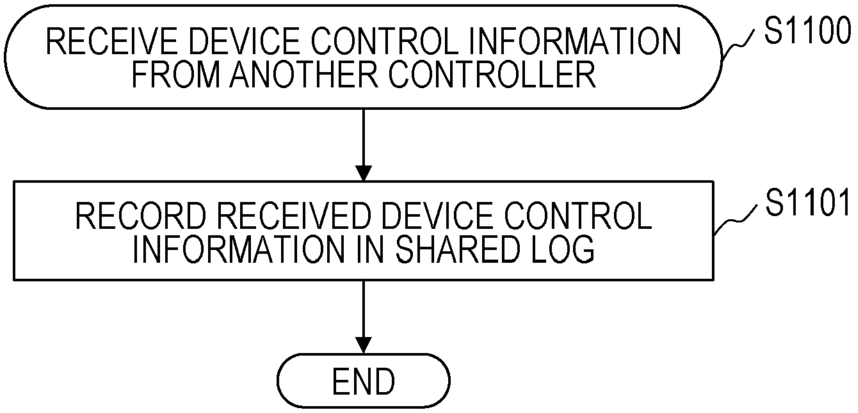
FIG. 8B is a flowchart illustrating a process routine of the controller of the first embodiment.

FIGS. 8A and 8B are flowcharts illustrating an operation of the controller 1 of the first embodiment. In the first embodiment, the device control screen 302 of FIG. 4B is employed.

FIG. 8A is the flowchart illustrating the operation of the controller 1 when the user enters the control request to the device. In step S1000, the operation unit 201 receives the control request of the user, and notifies the entered control request to the device controller 111.

The device controller 111 having received the notification notifies the control operation permit determination unit 104 of the contents of the control operation responsive to the control request, and enquires the control operation permit determination unit 104 about the permission of the control operation responsive to the control request and the remaining time period to be taken before the control operation is permitted (step S1001). The control operation permit determination unit 104 uses the shared log T3 stored in the log memory 103 and the control time interval table T7 stored in the device database 106 to determine whether the notified control operation is permitted (step S1002). If the control operation is denied, the control operation permit determination unit 104 calculates the remaining time period to be taken before the control operation is permitted, and transfers the calculated remaining time period together with the control operation permit determination results to the device controller 111.

Operations subsequent to step S1003 branch in response to the control operation permit determination results. If the control operation is permitted (yes branch from step S1003), the device controller 111 transmits the control command to the device (step S1007). On the other hand, if the control operation is denied (no branch from step S1003), the display 202 displays the control denial notification box 331 on the device control screen 302, thereby displaying that the control operation is denied, and the remaining time period before the control operation is permitted as illustrated in the bottom figure of FIG. 4B (step S1004).

As illustrated in the bottom figure of FIG. 4B, the display 202 displays the selection column 332 in the device control screen 302 and prompts the user to enter information as to whether the control operation to the input control request is to be automatically performed when the control operation is permitted (step S1005). If the user chooses not to perform the automatic execution of the control operation (no branch from step S1005), the process ends. In such a case, the user needs to enter the control request again when the remaining time period has elapsed.

If the user chooses to perform the automatic execution of the control operation (yes branch from step S1005), the device controller 111 holds the control request notified in step S1000 in suspension until the control operation is permitted (step S1006). The device controller 111 proceeds to step S1007 when the control operation is permitted. Since the control operation responsive to the control request is automatically executed in such a case, the user is free from entering the control request again when the control operation is permitted.

In step S1007, the device controller 111 transmits to the corresponding device a control command responsive to the control request. In step S1008, the log memory 103 stores in the shared log T3 the contents of the control operation responsive to the control request as a device control log.

In step S1009, the control information notifier 1011 transmits to another controller 1 the device control information indicating the contents of the executed control operation responsive to the control request. The other controller 1 updates the shared log T3 thereof in response to the device control information. In this way, the controllers 1 update the shared log T3 in a synchronized fashion in this way.

The operations in step S1007 to step 31009 may not necessarily be performed in this order but the operations in step S1007 to step 31009 may be performed in any other order. In order to acknowledge that the control operation has been successfully performed, an operation to acquire information concerning the status of the device or an operation to receive a reply to the control command from the device may be performed subsequent to step S1007.

FIG. 8B is a flowchart illustrating a process performed by the controller 1 when the device control information is received from another controller 1. In step S1100, the control information receiver 1012 receives the device control information indicating the contents of the control operation performed by the controller 1. The device control information received herein is the device control information transmitted by the other controller 1 in step 31009.

The log memory 103 records the contents of the control operation indicated by the received device control information in the shared log T3 in a similar way the controller 1 controls the device (step S1101). In this way, the device control log of the controller 1 and the device control log of the other controller 1 present over the network 20 are recorded in the shared log T3. The control operation permit determination unit 104 is thus enabled to determine whether the control operation is permitted or denied using the shared log T3 including the device control logs of the controller 1 and the other controller 1.

The controller 1, including the controller detector 105 configured to detect the presence of another controller 1 in the first embodiment, detects whether the other controller 1 is present over the network 20.

Figure 9A:
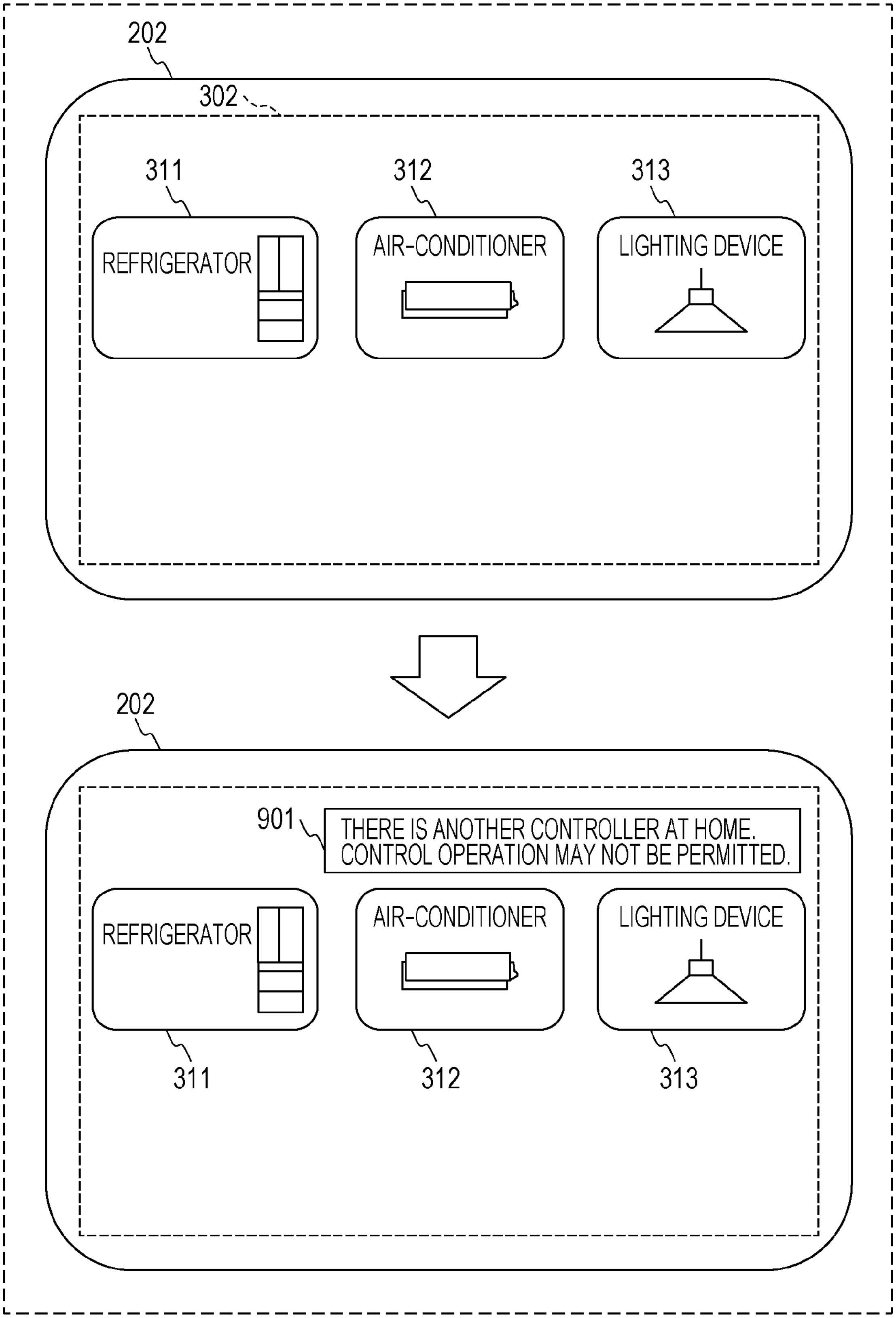
FIG. 9A illustrates a display example of the device control screen of the first embodiment.

FIG. 9A illustrates a display example of the device control screen 302 of the first embodiment. The device control screen 302 of FIG. 9A is a display example in which the controller detector 105 has detected the presence of another controller 1. The top figure of FIG. 9A illustrates the device control screen 302 in the initial state thereof, and is identical in detail to the top figure of FIG. 4A. If another controller 1 is connected to the network 20, the controller 1 may be denied to control the device. If the controller detector 105 has detected another controller 1, the display 202 displays on the device control screen 302 an alerting message 901 that alerts the user that the device is uncontrollable, as illustrated in the bottom figure of FIG. 9A. The alerting message 901 reads "There is another controller at home. Control operation may be denied." In response to the detection of the presence of another controller 1, the controller 1 may alert the user to the possibility that the control operation to the device is denied. As a result, this arrangement reduces the user's annoyance when the control operation to the device is actually denied.

In accordance with the first embodiment, the controller detector 105 employs a typical communication protocol to control and find a device connected to the network 20, and is thus enabled to detect a controller without the function of the controller 1 of the first embodiment (such a controller is hereinafter referred to as an "ordinary controller"). For example, the controller 1 may now make an enquiry to another controller. The controller 1 then determines whether the other controller is an ordinary controller, in accordance with information related to the controller included in a reply from the other controller (a serial number, for example).

Figure 9B:
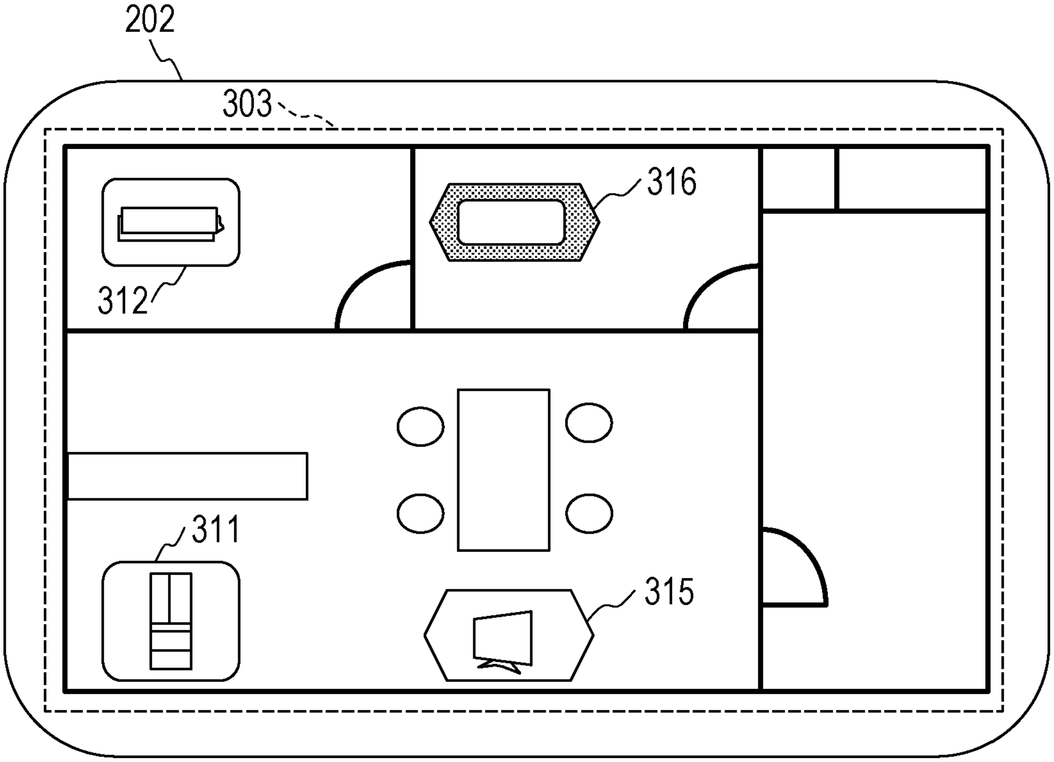
FIG. 9B illustrates a display example of the device control screen that displays the controller of the first embodiment separately from an ordinary controller.

FIG. 9B illustrates a display example of the device control screen 303 that displays the controller 1 of the first embodiment separately from the ordinary controller. The device control screen 303 of FIG. 9B displays a device icon 316 that indicates an ordinary controller detected by the controller detector 105. The device icon 316 is different in display form from the device icon 315 indicating the controller 1. For example, the device icon 316 and the device icon 315 may be displayed by setting different at least one of the three attributes of color of hue, chroma, and value therebetween. In this way, the user may differentiate the controller 1 that is permitted to control the device at appropriate control time intervals from the controller 1 that has no such function.

The device control screen 303 of FIG. 9B may also be implemented by the controller 1 of a second embodiment having the controller detector 105.

The controller 1 of the first embodiment includes the controller detector 105. Alternatively, the controller 1 of the first embodiment may not necessarily include the controller detector 105. In such a case, the control information notifier 1011 may broadcast the device control information.

If the device control system includes three or more controllers 1 in the first embodiment, the remaining controllers 1 other than one given controller 1 may hold the control request in suspension. In such a case, when the control operation to the device is permitted, the control operation responsive to the control request that has been held in suspension by the remaining controllers 1 is concurrently performed, and multiple control commands are concurrently transmitted to the device.

To avoid such an occurrence, the control operation permit determination unit 104 calculates a new "control time interval" of the device by adding a random duration of time to the "control time interval" acquired from the control time interval table T7. In this way, the timing of executing the control operation responsive to the control request held in suspension is changed from controller to controller.

From among the multiple controllers 1 with the control requests thereof held in suspension, a controller 1 with a new "control time interval" having the shortest duration of time transmits the control command responsive to the control request and is going to control the device. The controllers 1 other than the controller 1 having transmitted the control command update the shared log T3 in response to the device control information transmitted by the controller 1 having transmitted the control command. During the updating, the controllers 1 with the control requests thereof held in suspension re-calculate the control time intervals to the device.

Alternatively, the controller 1 adds a fixed duration of time that is different from controller to controller and assigned to the controller 1 to the control time interval acquired from the control time interval table T7, thereby calculating a new control time interval. The control operation permit determination unit 104 may calculate the fixed duration of time by calculating a hash value of the address of the host controller 1 over the network 20.

The controller 1 of the first embodiment operates in an identical way the controller 1 is present alone at home, except for the control permit determination operation described above. The user may operate the controller 1 without changing the operation procedure regardless of whether the single controller 1 or multiple controllers 1 are present at home.

Second Embodiment

Figure 10:
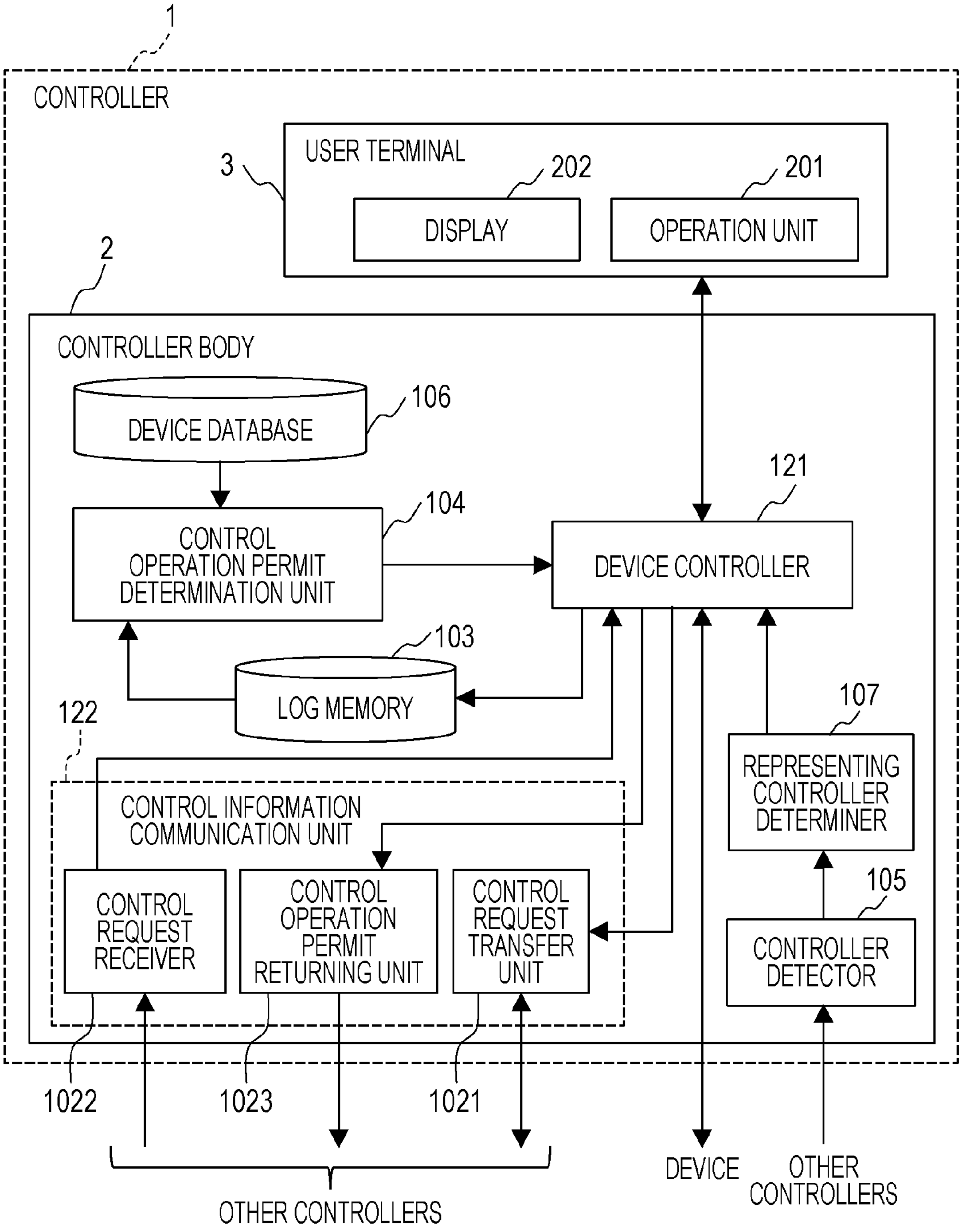
FIG. 10 illustrates a configuration example of a controller of a second embodiment.

FIG. 10 illustrates a configuration example of the controller 1 of a second embodiment. The controller 1 of the second embodiment further includes a controller detector 105, a device database 106, and a representing controller determiner 107 in addition to the elements of the controller 1 of FIG. 1. In the second embodiment, a control information communication unit 122 includes a control request transfer unit 1021, a control request receiver 1022, and a control operation permit returning unit 1023.

The controller detector 105 and the device database 106 are identical to the counterparts in the first embodiment. The representing controller determiner 107 determines a representing controller 1*a* from among multiple controllers 1 according to a predetermined rule as described below.

The control request transfer unit 1021 operates if the controller 1 is not a representing controller 1 but a non-representing controller 1*b*. The control request transfer unit 1021 transmits to the representing controller lathe control request received by the device controller 121.

The control request receiver 1022 operates if the controller 1 is the representing controller 1*a*, and receives the control request from the non-representing controller 1*b*.

The control operation permit returning unit 1023 operates if the controller 1 is the representing controller 1*a*. The control operation permit returning unit 1023 receives from the device controller 121 the notification of the determination results as to whether the control operation responsive to the control request received from the non-representing controller 1*b* is permitted. The control operation permit returning unit 1023 transmits, to the non-representing controller 1*b* serving as a request source, control permit/denial information representing the determination results.

The device controller 121 (an example of a request receiver) has a function of asking the representing controller determiner 107 whether the controller 1 is the representing controller 1*a*; in addition to the function of the device controller 101 of the first embodiment. The device controller 121 further has a function of notifying the control operation permit returning unit 1023 of the determination results responsive to the control request provided by the control operation permit determination unit 104. The device controller 121 further has a function of acquiring the control request received by the control request receiver 1022.

Figure 11:
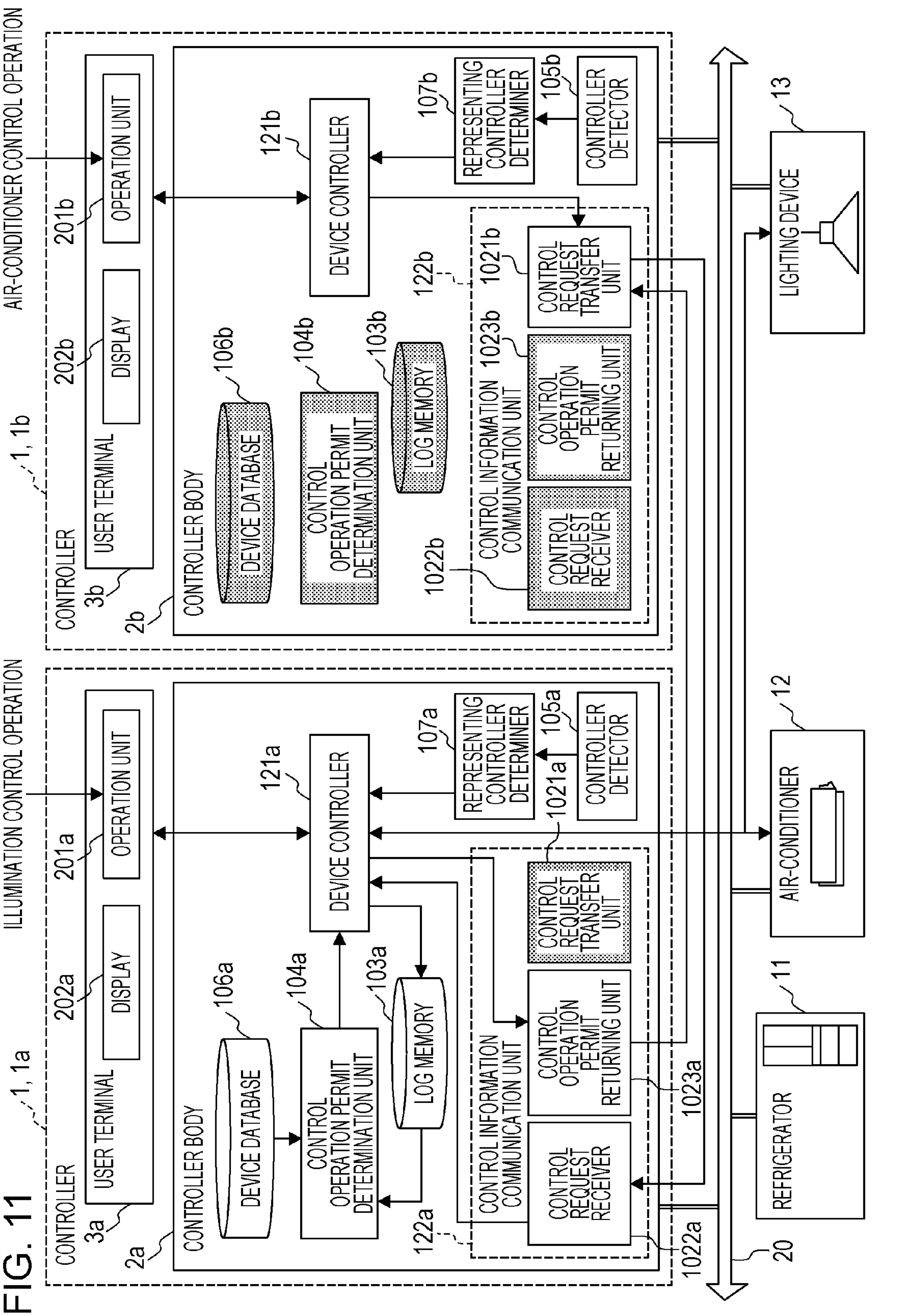
FIG. 11 illustrates an example of an entire configuration of a device control system of the second embodiment.

FIG. 11 illustrates an example of an entire configuration of the device control system of the second embodiment. In accordance with the second embodiment, a single controller is determined as a representing controller from among multiple controllers. Referring to FIG. 11, the left-hand side controller 1 is a representing controller 1*a* and the right-hand side controller is the non-representing controller 1*b*. The representing controller 1*a* stores the shared log T3 of controlling the device at home. The representing controller 1*a* determines whether the non-representing controller 1*b* is permitted to control the device in response to the control request input by the user. In accordance with the second embodiment, from among the elements of the controller 1, some elements operate in the representing controller 1*a* and other elements operate in the non-representing controller 1*b*. The elements inoperative in the representing controller 1*a* and the elements inoperative in the non-representing controller 1*b* are shadowed in FIG. 11. Each of the elements included in the representing controller 1*a* is represented by a symbol number ended with the letter "a", and each of the elements included in the non-representing controller 1*b* is represented by a symbol number ended with the letter "b" as illustrated in FIG. 11.

The representing controller determiner 107 determines, as the representing controller 1*a*, a controller from among the multiple controllers 1 that are present over the network 20 and detected by the controller detector 105.

The representing controller determiner 107 in each controller 1 determines the representing controller 1*a* in accordance with a predetermined rule. In accordance with the predetermined rule, the same one controller is determined to be the representing controller 1*a* from all the controllers 1 present over the network 20. More specifically, the predetermined rule is that the controller 1 having a minimum communication address over the network 20 is determined to be the representing controller 1*a*. Another predetermined rule may be that the controller 1 having the highest priority is determined to be the representing controller 1*a*.

In this case, the representing controller determiner 107 may calculate the priority of each controller in accordance with information that is exchanged among the controllers when the controller detector 105 detects another controller 1 and an ordinary controller connected over the network 20.

The information exchanged among the controllers includes the version of software used by the controller 1 or the serial number of the controller 1. The representing controller determiner 107 may calculate the priority such that the controller 1 having a later software version has a higher priority and such that the controller 1 having a particular serial number has a higher priority.

A later software version is considered to be improved in performance and free from flaws, and is more appropriate as the representing controller 1*a*. If a controller 1 mounted on a stationary apparatus, such as a television receiver, is compared with a controller 1 mounted on a portable device, such as a tablet terminal, the controller 1 mounted on the stationary apparatus is considered to operate more stably than the controller 1 mounted on the portable device, and is thus more appropriate for the representing controller 1*a*. For this reason, the particular serial number may be a serial number indicating a stationary apparatus. In accordance with the second embodiment, the determination method of the representing controller 1*a* is not limited to this method. Any rule may be used as long as the same single controller 1 is determined to be the representing controller 1*a* from among all the controllers 1.

The non-representing controller 1*b* transmits the control request to the representing controller 1*a* in the second embodiment. The control request includes at least the "device ID" of the device as a control target and the contents of the control operation. The control command the device controller 121 transmits to the device may be directly used as the contents of the control operation. The representing controller 1*a* identifies the device as the control target in accordance with the device ID included in the control request transmitted from the non-representing controller 1*b*, and then transmits the control command to the identified device. In accordance with the second embodiment, the representing controller 1*a* collects the device control logs of all the controllers 1 at home including the device control log of the host controller, records the collected logs in the shared log T3, and then transmits the control command to the corresponding device.

Figure 12A:
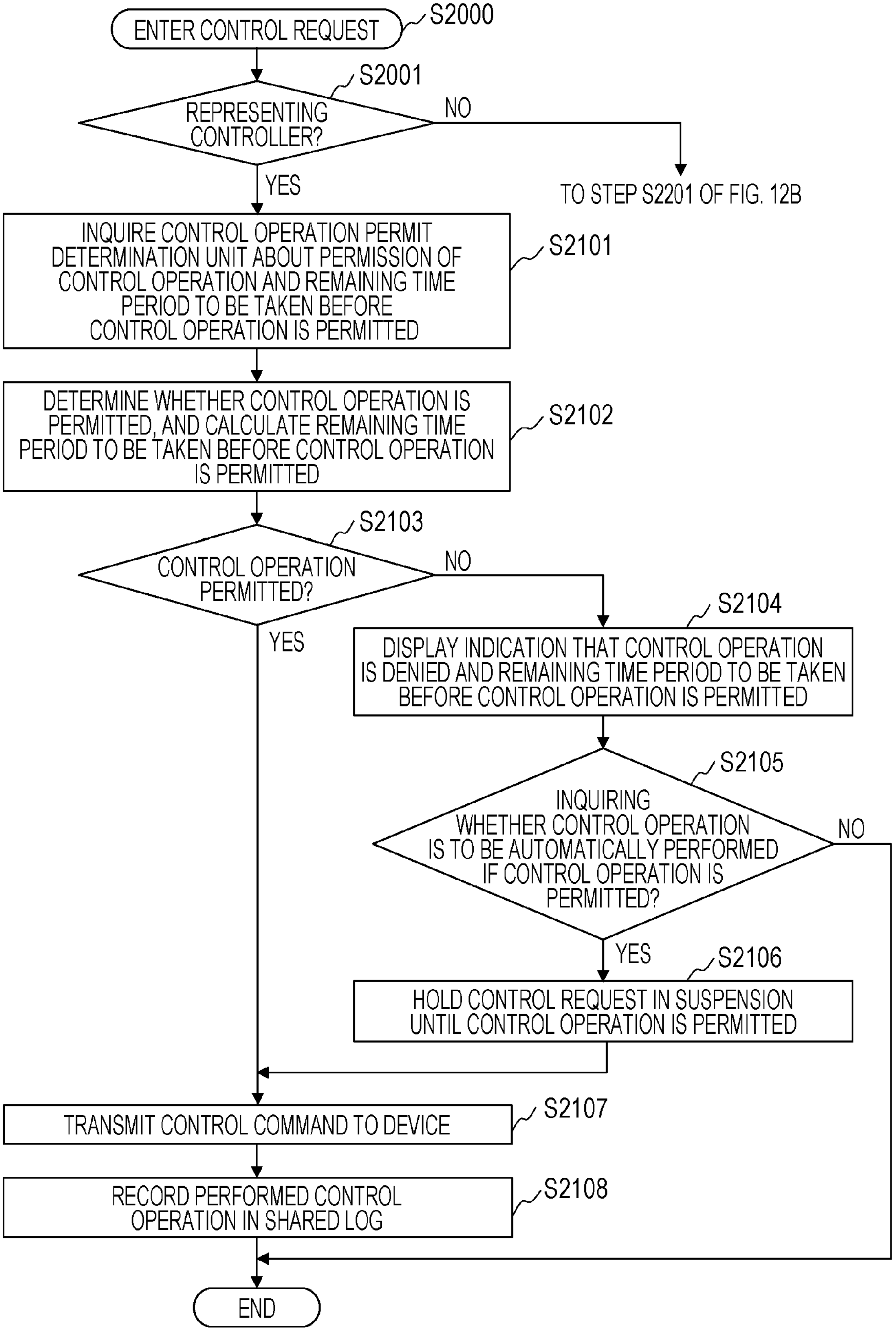
FIG. 12A is a flowchart illustrating a process routine of the controller of the second embodiment.
Figure 12B:
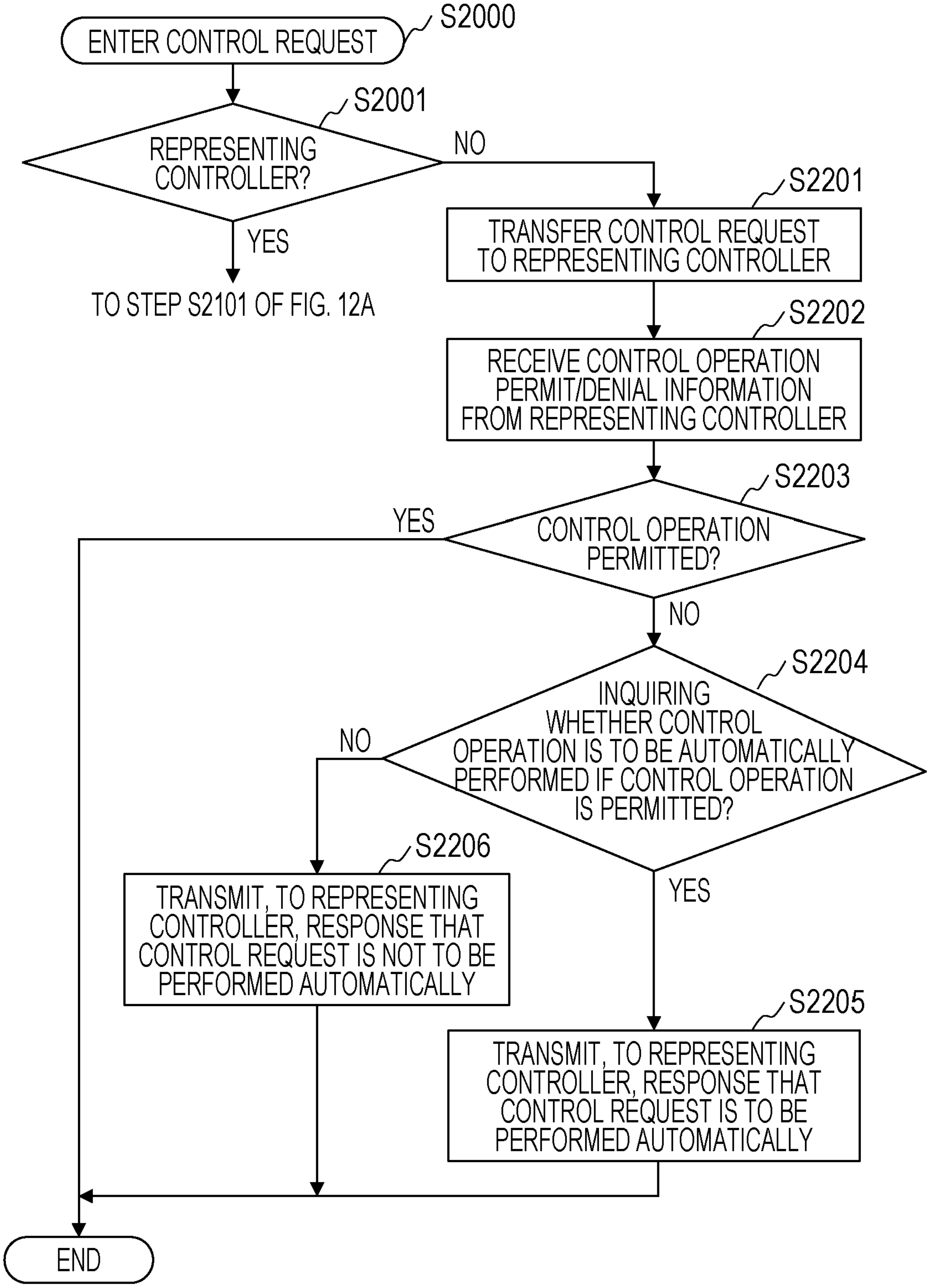
FIG. 12B is a flowchart illustrating a process routine of the controller of the second embodiment.
Figure 12C:
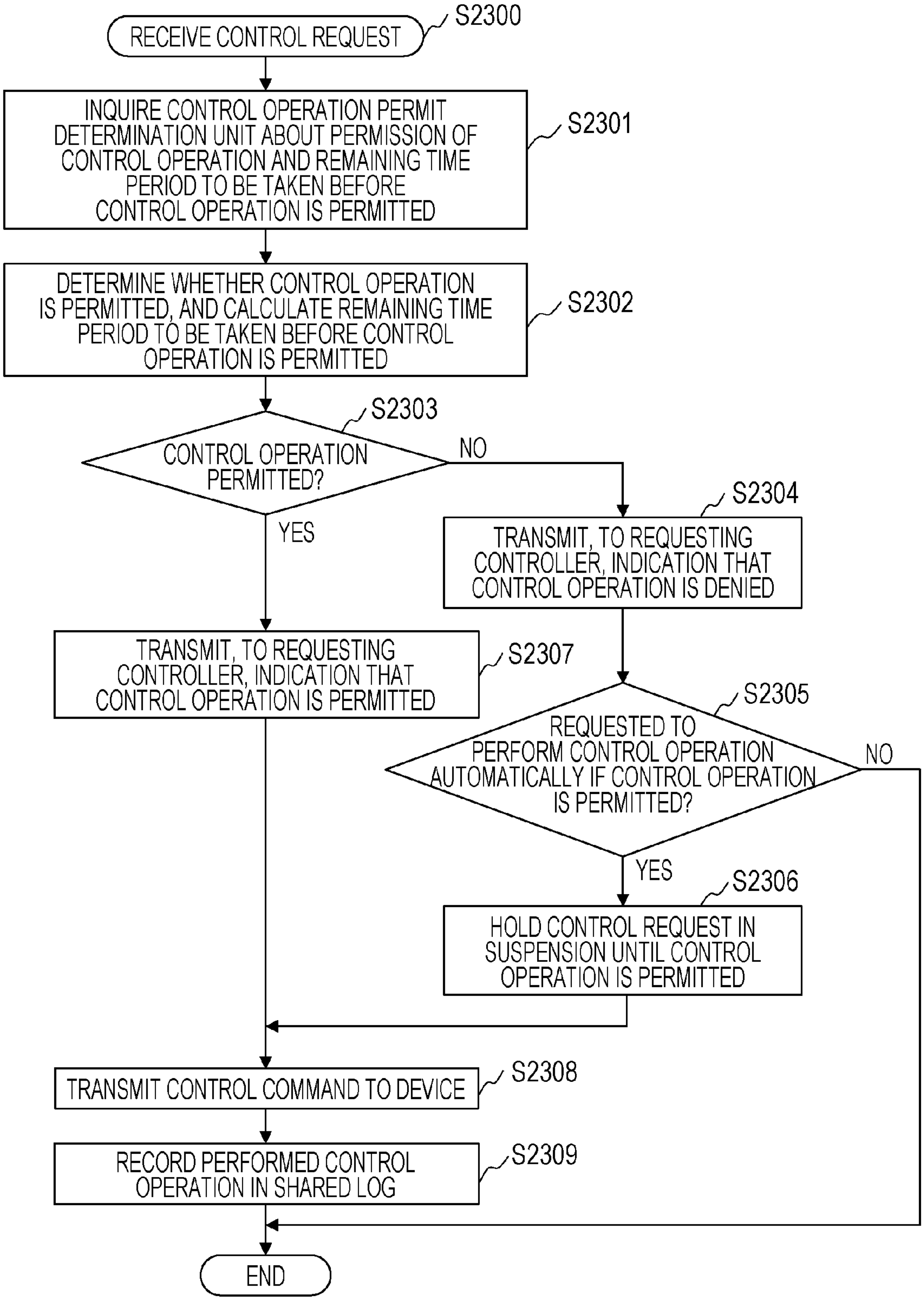
FIG. 12C is a flowchart illustrating a process routine of the controller of the second embodiment.

FIGS. 12A through 12C are flowcharts illustrating the process of the controller 1 in accordance with the second embodiment. As illustrated in FIGS. 12A through 12C, the device control screen 302 of FIG. 4B is referenced in the same way as in the first embodiment.

FIG. 12A is the flowchart illustrating the process performed by the controller 1*a* when a control request has been received from the user. In step S2000 of FIG. 12A, the operation unit 201*a* in the representing controller 1*a* receives the control request from the user, and notifies the device controller 121*a* of the input control request. In step S2001, the device controller 121*a* asks the representing controller determiner 107*a* whether the host controller 1 is currently the representing controller 1*a*.

FIG. 12A illustrates operations subsequent to step S2101 performed if the controller 1 is the representing controller 1*a* (yes branch from step S2001). If the controller 1 is not the representing controller 1*a* (no branch from step S2001), processing proceeds to step S2201 of FIG. 12B. Operations in step S2201 and subsequent steps may be performed.

Operations in steps S2101 through S2108 are respectively identical to operations in steps S1001 through S1008 of the first embodiment. More specifically, the control operation permit determination unit 104*a* determines whether the control operation responsive to the input control request is permitted, in accordance with the shared log T3 and the control time interval acquired from the control time interval table T7 (steps S2101 through S2103). If the control operation is permitted (yes branch from step S2103), the device controller 121*a* transmits the control command to the device (step S2107). If the control operation is denied (no branch from step S2103), the display 202*a* displays on the device control screen 302 the information that the control operation is denied, and the remaining time period to be taken before the control operation is permitted as illustrated in the bottom figure of FIG. 4B (step S2104). When the control operation is permitted, the display 202*a* prompts the user to enter a decision as to whether the control operation responsive to the control request is automatically performed when the control operation is permitted (step S2105). If the user chooses the automatic execution of the control operation (yes branch from step S2105), the device controller 121*a* holds the control request in suspension until the control operation is permitted (step S2106), and then transmits the control command when the control operation is permitted (step S2107). Subsequent to the transmission of the control command, the log memory 103*a* records the contents of the control operation responsive to the control request in the shared log T3 (step S2108). Since the non-representing controller 1*b* is free from managing the shared log T3 in the second embodiment, the representing controller 1*a* does not transmit the control request to the non-representing controller 1*b* in this flowchart.

FIG. 12B illustrates the process performed by the non-representing controller 1*b* when the non-representing controller 1*b* receives the control request from the user. Steps S2000 and S2001 are identical in operation to those in FIG. 12A. Since the controller 1 is the non-representing controller 1*b*, the device controller 121*b* determines that the controller 1 is not the representing controller 1*a* (no branch from step S2001). If the controller 1 is the representing controller 1*a* (yes branch from step S2001), processing proceeds to step S2101 of FIG. 12A.

The control request transfer unit 1021*b* transmits the control request to the representing controller 1*a* determined by the representing controller determiner 107*b* (step S2201). The control request transfer unit 1021*b* receives control permit/denial information (to be discussed below) returned by the representing controller 1*a* (step S2202).

The device controller 121*b* determines in accordance with the received control permit/denial information whether the control operation is permitted (step S2203). If the control permit/denial information indicates that the control operation is permitted (yes branch from step S2203), the device controller 121*b* ends the process. If the control permit/denial information indicates that the control operation is denied (no branch from step S2203), the device controller 121*b* proceeds to step S2204.

In step 32204, the display 202*b* prompts the user to enter a decision as to whether the control operation responsive to the control request is automatically performed when the control operation is permitted. If the user chooses the automatic execution of the control operation (yes branch from step 32204), the control request transfer unit 1021*b* transmits to the representing controller 1*a* a response indicating that the control operation is to be automatically performed (step S2205). On the other hand, if the user does not choose the automatic execution of the control operation (no branch from step 32204), the control request transfer unit 1021*b* transmits to the representing controller 1*a* a response indicating that the control operation responsive to the control request is not to be performed automatically (step 32206).

FIG. 12C illustrates the process performed by the representing controller 1*a* when the representing controller 1*a* receives the control request from the non-representing controller 1*b*. The control request receiver 1022*a* receives the control request transferred in step S2201 of FIG. 12B (step 32300).

In response to the control request received from the non-representing controller 1*b* in the second embodiment, the representing controller 1*a* performs an operation identical to the operation performed when the operation unit 201*a* in the representing controller 1*a* receives the control request from the user (step S2000 of FIG. 12A).

More specifically, the device controller 121*a* asks the control operation permit determination unit 104*a* whether the control operation responsive to the control request received from the non-representing controller 1*b* is currently permitted, and about the remaining time period to be taken before the control operation is permitted (step 32301). In response to the enquiry, the control operation permit determination unit 104*a* determines whether the control operation responsive to the control request received from the non-representing controller 1*b* is currently permitted, and calculates the remaining time period to be taken before the control operation is permitted (step 32302).

If the control operation is permitted (yes branch from step 32303), the control operation permit returning unit 1023*a* transmits the control permit/denial information indicative of the control permission to the non-representing controller 1*b* which has transferred the control request (step S2307). The control permit/denial information transmitted in step S2307 is received by the control request transfer unit 1021*b* of the non-representing controller 1*b* in step S2202 of FIG. 12B. In this way, the non-representing controller 1*b* recognizes that the control operation responsive to the transferred control request is permitted.

The device controller 121*a* transmits to the device the control command responsive to the control request received from the non-representing controller 1*b* (step 32308). The control operation responsive to the control request transferred from the non-representing controller 1*b* is to be performed by the representing controller 1*a*.

If the control operation is denied (no branch from step 32303), the control operation permit returning unit 1023*a* transmits the control permit/denial information indicative of control denial to the non-representing controller 1*b* that has transferred the control request (step 32304). The control permit/denial information transmitted in step 32304 is received by the control request transfer unit 1021*b* in the non-representing controller 1*b* in step 32202 of FIG. 12B. In this way, the non-representing controller 1*b* recognizes that the control operation responsive to the transferred control request is denied.

In step S2305, the control request receiver 1022*a* receives the response that is transferred from the non-representing controller 1*b* in step 32205 of FIG. 12B and indicates that the control operation responsive to the control request is to be performed automatically, and the response that is transferred from the non-representing controller 1*b* in step S2206 of FIG. 12B and indicates that the control operation responsive to the control request is not to be performed automatically. If the response indicating that the control operation responsive to the control request is not to be automatically performed is received, and the automatic execution of the control operation is not requested (no branch from step S2305), the process ends.

If the response indicating that the control operation responsive to the control request is to be automatically performed is received, and the automatic execution of the control operation is requested (yes branch from step 32305), the device controller 121*a* holds the control request received in step S2300 in suspension (step S2306), and transmits the control command when the control operation is permitted (step S2308).

Subsequent to the transmission of the control command, the log memory 103*a* records the contents of the control operation responsive to the control request in the shared log T3 (step S2309). The contents of the control operation responsive to the control request received from the non-representing controller 1*b* in step 32300 are recorded in the shared log T3.

Through the process described above, the contents of the control operation responsive to the control request input from the representing controller 1*a* and the contents of the control operation responsive to the control request input from the non-representing controller 1*b* are recorded in the shared log T3 of the representing controller 1*a*. In this way, the representing controller 1*a* determines not only whether the control operation responsive to the control request input to the non-representing controller 1*b* is permitted but also whether the control operation responsive to the control request input to the representing controller 1*a* is permitted. As a result, even if there are multiple controllers 1 at home, the device is controlled at appropriate time intervals.

As illustrated in the bottom figure of FIG. 4B, the second embodiment employs the device control screen 302 on which the control denial notification box 331 including the selection column 332 and the status display column 333 is displayed. The disclosure is not limited to this arrangement. The device control screen 301 of FIG. 4A or the device control screen 303 of FIG. 4C may be employed.

In accordance with the second embodiment, control of all devices is collectively performed on the representing controller 1*a*. The representing controller 1*a* actually controls the device. The non-representing controller 1*b* is thus free from managing the shared log T3, and the representing controller 1*a* controls the device at appropriate time intervals.

If it is determined in step S2203 of FIG. 12B that the control operation to the device is permitted (yes branch from step S2203), the display 202*b* in the non-representing controller 1*b* serving as a request source may display information that the control operation to the device is permitted. In such a case, the display 202*a* simply displays a message, indicating that the control operation to the device is permitted, on each of the device control screens 301, 302, and 303.

On the other hand, the display 202*b* in the non-representing controller 1*b* other than the request source and the display 202*a* in the representing controller 1*a* may display information indicating that the control operation to the device is denied. In this case, the display 202*b* and the display 202*a* may display the device control screens 301, 302, and 303 of FIGS. 4A, 4B, and 4C as they are, to indicate that the control operation to the device is denied.

The technique disclosed in the disclosure is useful as a technique to control a device in a network environment where multiple controllers are present.

What is claimed is:

1. A method of controlling a device connected to a network that is connected to a first control apparatus and a second control apparatus different from the first control apparatus, the method comprising:

receiving, from the second control apparatus, a device control log of the second control apparatus, when the second control apparatus controls the device;

adding the received device control log of the second control apparatus to a device control log of the first control apparatus to obtain a shared log, upon receiving the device control log of the second control apparatus;

storing the shared log;

acquiring a control request to the device from a user of the first control apparatus;

determining whether the device is ready for control by the first control apparatus responsive to the acquired control request based on the shared log; and transmitting, to the device, a control command responsive to the acquired control request when it is determined that the device is ready for control by the first control apparatus.

2. The method according to claim 1, wherein, in the determining, it is determined that the device is ready for control by the first control apparatus, when a predetermined time period elapses since the device is controlled last.

3. The method according to claim 1, further comprising displaying information, indicating that the device is not ready for control by the first control apparatus, on a display of the first control apparatus or a display connected to the first control apparatus via the network, when it is determined that the device is not ready for control by the first control apparatus.

4. The method according to claim 3, further comprising displaying a remaining time until the device is ready for control by the first control apparatus.

5. The method according to claim 4, further comprising displaying information prompting the user of the first control apparatus to input a response to an enquiry as to whether the device is to be automatically controlled in response to the acquired control request when the device becomes ready for control by the first control apparatus, wherein, in the transmitting, the control command is transmitted to the device after an elapse of the remaining time, in response to the input response indicating that the device is to be automatically controlled by the first control apparatus.

6. The method according to claim 3, further comprising: displaying a current status of the device.

7. The method according claim 1, further comprising:

detecting a control apparatus that is different in type and function from the first control apparatus, using information contained in communication data transmitted from the different control apparatus; and displaying information, indicating that the different control apparatus is present, on a display of the first control apparatus or a display connected to the first control apparatus via the network when the different control apparatus has been detected.

8. The method according claim 1, further comprising transmitting information related to the control command to the second control apparatus when the control command has been transmitted to the device in the transmitting.

9. A method of controlling a device connected to a network that is connected to a first control apparatus and a second control apparatus different from the first control apparatus, the method comprising:

receiving from the second control apparatus a control request to the device input from a user of the second control apparatus, when the control request is input to the second control apparatus;

adding the received control request, serving as a device control log of the second control apparatus, to a device control log of the first control apparatus to obtain a shared log, upon receiving the control request from the second control apparatus;

storing the shared log;

determining whether the device is ready for control by the second control apparatus, responsive to the received control request based on the shared log; and transmitting, to the device, a control command responsive to the received control request when it is determined that the device is ready for control by the second control apparatus.

10. The method according claim 9, wherein, in the determining, it is determined that the device is ready for control by the second control apparatus, when a predetermined time period elapses since the device is controlled last.

11. The method according claim 9, further comprising displaying information, indicating that the device is not ready for control by the second control apparatus, on a display of the second control apparatus or a display connected to the second control apparatus via the network, when it is determined that the device is not ready for control by the second control apparatus.

12. The method according claim 11, further comprising displaying a remaining time until the device is ready for control by the second control apparatus.

13. The method according to claim 12, further comprising displaying information prompting the user of the second control apparatus to input a response to an enquiry as to whether the device is to be automatically controlled in response to the received control request when the device becomes ready for control by the second control apparatus, wherein, in the transmitting, the control command is transmitted to the device after an elapse of the remaining time, in response to the input response indicating that the device is to be automatically controlled by the second control apparatus.

14. The method according to claim 11, further comprising displaying a current status of the device.

15. The method according claim 9, further comprising:

when it is determined that the device is ready for control by the second control apparatus in the determining, displaying information, indicating that the device is ready for control by the second control apparatus, on a display of the second control apparatus or a display connected to the second control apparatus via the network; and displaying information, indicating that the device is not ready for control by a third control apparatus, on the third control apparatus different from the first control apparatus and the second control apparatus or on a display connected to the third control apparatus via the network.

16. A control apparatus connected to a network and controlling a device, the network connected to a first control apparatus serving as the control apparatus and a second control apparatus different from the first control apparatus, the control apparatus comprising:

one or more memories; and circuitry which, in operation:

adds a device control log of the second control apparatus to a device control log of the first control apparatus to obtain a shared log upon receiving the device control log of the second control apparatus;

stores the shared log in the one or more memories;

acquires a control request to the device from a user of the first control apparatus;

determines whether the device is ready for control by the first control apparatus responsive to the acquired control request based on the shared log; and transmits, to the device, a control command responsive to the acquired control request when it is determined that the device is ready for control by the first control apparatus.

17. A control apparatus connected to a network and controlling a device, the network connected to a first control apparatus serving as the control apparatus and a second control apparatus different from the first control apparatus, the control apparatus comprising:

one or more memories and circuitry which, in operation:

receives, from the second control apparatus, a control request to the device input from a user of the second control apparatus, when the control request is input to the second control apparatus;

adds the received control request, serving as a device control log of the second control apparatus, to a device control log of the first control apparatus to obtain a shared log, upon receiving the control request from the second control apparatus;

stores the shared log in the one or more memories;

determines whether the device is ready for control by the second control apparatus, responsive to the received control request based on the shared log; and transmits, to the device, a control command responsive to the received control request when it is determined that the device is ready for control by the second control apparatus.

* * * * *